United States Patent
Aihara

(10) Patent No.: US 7,139,441 B2
(45) Date of Patent: Nov. 21, 2006

(54) IMAGE PROCESSING DEVICE PERFORMING INCLINATION CORRECTING PROCESSING

(75) Inventor: Nobuhiro Aihara, Osaka (JP)

(73) Assignee: Minolta Co., Ltd., Osaka (JP)

(*) Notice: Subject to any disclaimer, the term of this patent is extended or adjusted under 35 U.S.C. 154(b) by 822 days.

(21) Appl. No.: 10/361,813

(22) Filed: Feb. 11, 2003

(65) Prior Publication Data

US 2004/0091172 A1    May 13, 2004

(30) Foreign Application Priority Data

Nov. 13, 2002    (JP)    ............... 2002-329393

(51) Int. Cl.
G06K 9/32    (2006.01)
G06K 9/00    (2006.01)
(52) U.S. Cl. ................... 382/298; 382/296
(58) Field of Classification Search ........ 382/168, 382/172, 173, 190, 199, 254, 276, 289, 312, 382/293–299; 345/657; 358/3.26, 488, 358/501, 505, 522; 348/240.3, 63; 353/69, 353/70; 355/25, 39, 47, 52
See application file for complete search history.

(56) References Cited

U.S. PATENT DOCUMENTS

| | | | | |
|---|---|---|---|---|
| 5,093,653 A | * | 3/1992 | Ikehira | ............ 345/657 |
| 5,430,550 A | * | 7/1995 | Hashimoto et al. | ......... 358/488 |
| 5,627,912 A | * | 5/1997 | Matsumoto | ............ 382/146 |
| 5,940,128 A | * | 8/1999 | Morimura | ............ 348/240.3 |
| 7,006,708 B1 | * | 2/2006 | Nako et al. | ............ 382/294 |
| 7,065,261 B1 | * | 6/2006 | Horie | ............ 382/289 |
| 2004/0091172 A1 | * | 5/2004 | Aihara | ............ 382/298 |

FOREIGN PATENT DOCUMENTS

| | | |
|---|---|---|
| JP | 57-069372 | 4/1982 |
| JP | 8-23439 | 1/1996 |
| JP | 2001-320554 | 11/2001 |

* cited by examiner

*Primary Examiner*—Amir Alavi
(74) *Attorney, Agent, or Firm*—Buchanan Ingersoll & Rooney PC

(57) ABSTRACT

An image processing device extracts resolution data from an input image data, and executes resolution converting processing on the input image data to provide longitudinal and lateral resolutions equal to each other when the longitudinal and lateral resolutions are different from each other. An inclination of the image having the longitudinal and lateral resolutions equal to each other is detected, and the image data having the longitudinal and lateral resolutions equal to each other is rotated in accordance with the inclination. Resolution converting processing is executed again on the rotated image data to restore the longitudinal and lateral resolutions to the original resolutions, respectively.

18 Claims, 19 Drawing Sheets

IMAGE PROCESSING DEVICE PERFORMING INCLINATION CORRECTING PROCESSING

This application is based on Japanese Patent Application No. 2002-329393, the entire content of which is hereby incorporated by reference.

BACKGROUND OF THE INVENTION

1. Field of the Invention

The present invention relates to an image processing device, an image processing method and an image processing program product, and particularly to an image processing device, an image processing method and an image processing program product, which perform inclination correcting processing on an input image data.

2. Description of the Background Art

In addition to image data obtained by scanners, image data read by facsimile machines are now handled on computers in some cases, and such cases are increasing.

Image data, which is obtained from the facsimile machine in a certain operation mode, may have a longitudinal resolution different from a lateral resolution. For example, a facsimile machine in a super-fine mode provides an image having longitudinal and lateral resolutions of 200 dpi×400 dpi.

In many cases, the image obtained by the scanner has longitudinal and lateral resolutions equal to each other. In some types of scanners, longitudinal and lateral read resolutions can be set independently of each other.

Various methods have been proposed for performing inclination correcting processing of correcting an inclination of read image data. For example, Japanese Patent Laying-Open No. 57-69372 has disclosed an inclination correcting device, in which a cumulative histogram is prepared for each of lines of the read image in various scanning directions, and an inclination angle is detected by utilizing properties that a distinct peak occurs in the cumulative histogram when the scanning direction and the inclination angle match with each other. The inclination correcting device corrects the inclination by rotating the read image based on the inclination angle thus detected.

Japanese Patent Laying-Open No. 8-23439 has also disclosed a facsimile machine, which corrects an inclination of a read image by detecting an inclination angle in a similar manner.

Japanese Patent Laying-Open No. 2001-320554 has disclosed a facsimile machine, which detects rules defining rectangular regions from read image data, detects the inclination angle by detecting an angular shift of the rules and thereby corrects the inclination.

The inclination correcting processing disclosed in Japanese Patent Laying-Open No. 57-69372 and others is predicated on that the read image has the longitudinal and lateral resolutions equal to each other, and thus the inclination angle of the lateral direction of the read image is equal to the inclination angle of the longitudinal direction. For example, if the read image is inclined by an angle as shown in FIG. 22, the inclinations of the longitudinal and lateral directions can be simultaneously corrected by rotating clockwise the image by an angle $\theta$.

However, if the longitudinal resolution of the read image is equal to half the lateral resolution thereof as shown in FIG. 23, the inclination angle $(\theta-\alpha)$ of the lateral direction is different from the inclination angle $(\theta+\beta)$ of the longitudinal direction. Even when the foregoing inclination correcting processing is effected on this image, and thus, even when the image is rotated by an angle of $(\theta-\alpha)$ to correct the inclination of the lateral direction, the inclination of the longitudinal direction is still left at an angle of $((\theta+\beta)-(\theta-\alpha))=(\alpha+\beta)$. A similar problem occurs when the image is rotated to correct the inclination of the longitudinal direction.

A specific example, in which the foregoing processing is applied to a practical image, will now be described with reference to the drawings. FIG. 24 shows a practical example of an inclined image, of which longitudinal resolution is different from the lateral resolution. More specifically, the image shown in FIG. 24 is read by a facsimile machine, has resolutions of 200 dpi×400 dpi and is inclined. FIG. 25 shows a specific example of an image, which is produced by effecting the foregoing inclination correcting processing on the above inclined image having the longitudinal and lateral resolutions different from each other. Referring to FIG. 25, when the foregoing inclination correcting processing is effected on the inclined image in FIG. 24 having the longitudinal and lateral resolutions different from each other, the inclination of the lateral direction is eliminated. However, the inclination of the longitudinal direction is not eliminated.

In the above case, the corrected image shown in FIG. 25 may be further shifted laterally by a slight extent on a row-by-row basis or block-by-block basis so that the inclination of the longitudinal direction can be corrected. In this manner, however, the inclined characters and lines are merely shifted laterally. Therefore, an image quality is impaired.

SUMMARY OF THE INVENTION

An object of the invention is to provide an image processing device, an image processing method and an image processing program product, which can appropriately perform inclination correcting processing without impairing an image quality even when an input image has longitudinal and lateral resolutions different from each other.

The above object is achieved by an image processing device including an extracting portion for extracting longitudinal and lateral resolutions of an input image; a first resolution converting portion for determining whether the extracted longitudinal and lateral resolutions of the image are equal to each other or not, and converting one of the longitudinal and lateral resolutions to become equal to the other and thereby to provide the longitudinal and lateral resolutions equal to each other when the longitudinal and lateral resolutions are different from each other; a detecting portion for detecting an inclination of the input image; an inclination correcting portion for correcting an inclination of the image having the resolution converted by the first resolution converting portion by rotating the image in accordance with the inclination of the image detected by the detecting portion; and a second resolution converting portion for performing resolution conversion on the image subjected to the inclination correction by the inclination correcting portion to convert the one resolution converted by the first resolution converting portion to the original resolution.

Desirably, the first resolution converting portion of the image processing device converts the lower resolution between the longitudinal and lateral resolutions of the image to become equal to the other of the resolutions when the lower resolution is lower than a predetermined resolution.

Alternatively, it is desirable that the first resolution converting portion of the image processing device converts the higher resolution between the longitudinal and lateral resolutions of the image to become equal to the lower resolution when the lower resolution is higher than a predetermined resolution.

Desirably, the detecting portion of the image processing device extracts, as a first inclination detection region, a regular square region containing most edge components from an edge image produced by reducing and changing the image having the converted resolution into a binary form, performs calculation on each of the first inclination detection region and a second inclination detection region prepared by rotating the first inclination detection region by 90 degrees to calculate a degree of undulation of a cumulative histogram of the edge components for each of predetermined ranges of the detection angles, and determines the detection angle providing the largest degree of undulation as the inclination of the image.

Further, the image processing device is a multi-functional peripheral integrally formed of at least two of a scanner for reading a document image, a printer for printing an image data and a communication portion for communication with an external device. The extracting portion extracts longitudinal and lateral resolutions of an image read by the scanner or an image received from the external device via the communication portion. The detecting portion detects the inclination of the image read by the scanner or the image received from the external device via the communication portion.

For achieving the above object, the invention according to another aspect provides an image processing device including an extracting portion for extracting longitudinal and lateral resolutions of an input image; a first resolution converting portion for determining whether the extracted longitudinal and lateral resolutions of the image are equal to each other or not, and converting one of the longitudinal and lateral resolutions to become equal to the other and thereby to provide the longitudinal and lateral resolutions equal to each other when the longitudinal and lateral resolutions are different from each other; a detecting portion for detecting an inclination of the input image; an inclination correcting portion for correcting an inclination of the image having the resolution converted by the first resolution converting portion by rotating the image in accordance with the inclination of the image detected by the detecting portion; and a second resolution converting portion for performing resolution conversion on the image subjected to the inclination correction by the inclination correcting portion to convert the one resolution converted by the first resolution converting portion to an intended resolution.

Desirably, the first resolution converting portion of the image processing device converts the lower resolution between the longitudinal and lateral resolutions of the image to become equal to the other of the resolutions when the lower resolution is lower than a predetermined resolution.

Alternatively, it is desirable that the first resolution converting portion of the image processing device converts the higher resolution between the longitudinal and lateral resolutions of the image to become equal to the lower resolution when the lower resolution is higher than a predetermined resolution.

Desirably, the detecting portion of the image processing device extracts, as a first inclination detection region, a regular square region containing most edge components from an edge image produced by reducing and changing the image having the converted resolution into a binary form, performs calculation on each of the first inclination detection region and a second inclination detection region prepared by rotating the first inclination detection region by 90 degrees to calculate a degree of undulation of a cumulative histogram of the edge components for each of predetermined ranges of the detection angles, and determines the detection angle providing the largest degree of undulation as the inclination of the image.

Further, the image processing device is a multi-functional peripheral integrally formed of at least two of a scanner for reading a document image, a printer for printing an image data and a communication portion for communication with an external device. The extracting portion extracts longitudinal and lateral resolutions of an image read by the scanner or an image received from the external device via the communication portion. The detecting portion detects the inclination of the image read by the scanner or the image received from the external device via the communication portion.

For achieving the above object, the invention according to still another aspect provides an image processing device including an extracting portion for extracting longitudinal and lateral resolutions of an input image; a first resolution converting portion for determining whether the extracted longitudinal and lateral resolutions of the image are equal to each other or not, and converting the longitudinal and lateral resolutions to predetermined specific resolutions, respectively, when the longitudinal and lateral resolutions are different from each other; a detecting portion for detecting an inclination of the input image; an inclination correcting portion for correcting an inclination of the image having the resolution converted by the first resolution converting portion by rotating the image by an inclination angle of the image detected by the detecting portion in a direction opposite to the detected inclination; and a second resolution converting portion for performing resolution conversion on the image subjected to the inclination correction by the inclination correcting portion to convert the longitudinal and lateral resolutions converted by the first resolution converting portion to the original resolutions, respectively.

Further, the image processing device is a multi-functional peripheral integrally formed of at least two of a scanner for reading a document image, a printer for printing an image data and a communication portion for communication with an external device. The extracting portion extracts longitudinal and lateral resolutions of an image read by the scanner or an image received from the external device via the communication portion. The detecting portion detects the inclination of the image read by the scanner or the image received from the external device via the communication portion.

For achieving the above object, the invention according to further another aspect provides an image processing method including an extracting step of extracting longitudinal and lateral resolutions of an input image; a first resolution converting step of determining whether the extracted longitudinal and lateral resolutions of the image are equal to each other or not, and converting one of the longitudinal and lateral resolutions to become equal to the other and thereby to provide the longitudinal and lateral resolutions equal to each other when the longitudinal and lateral resolutions are different from each other; an inclination correcting step of correcting an inclination of the image having the resolution converted in the first resolution converting step by rotating the image by a predetermined angle; and a second resolution converting step of performing resolution conversion on the image subjected to the inclination correction in the inclination correcting step to convert the one resolution converted in the first resolution converting step to the original resolution.

Desirably, the first resolution converting step of the image processing method converts the lower resolution between the longitudinal and lateral resolutions of the image to become equal to the other of the resolutions when the lower resolution is lower than a predetermined resolution.

Alternatively, it is desirable that the first resolution converting step of the image processing method converts the higher resolution between the longitudinal and lateral resolutions of the image to become equal to the lower resolution when the lower resolution is higher than a predetermined resolution.

For achieving the above object, the invention according to a further aspect provides an image processing method including an extracting step of extracting longitudinal and lateral resolutions of an input image; a first resolution converting step of determining whether the extracted longitudinal and lateral resolutions of the image are equal to each other or not, and converting the longitudinal and lateral resolutions to predetermined specific resolutions, respectively, when the longitudinal and lateral resolutions are different from each other; an inclination correcting step of correcting an inclination of the image having the resolution converted in the first resolution converting step by rotating the image by a predetermined inclination angle; and a second resolution converting step of performing resolution conversion on the image subjected to the inclination correction in the inclination correcting step to convert the longitudinal and lateral resolutions converted in the first resolution converting step to the original resolutions, respectively.

For achieving the above object, the invention according to a further aspect provides an image processing program product for executing, by a computer, image processing including an extracting step of extracting longitudinal and lateral resolutions of an input image; a first resolution converting step of determining whether the extracted longitudinal and lateral resolutions of the image are equal to each other or not, and converting one of the longitudinal and lateral resolutions to become equal to the other and thereby to provide the longitudinal and lateral resolutions equal to each other when the longitudinal and lateral resolutions are different from each other; an inclination correcting step of correcting an inclination of the image having the resolution converted in the first resolution converting step by rotating the image by a predetermined angle; and a second resolution converting step of performing resolution conversion on the image subjected to the inclination correction in the inclination correcting step to convert the one resolution converted in the first resolution converting step to the original resolution.

For achieving the above object, the invention according to a further aspect provides an image processing program product for executing, by a computer, image processing including an extracting step of extracting longitudinal and lateral resolutions of an input image; a first resolution converting step of determining whether the extracted longitudinal and lateral resolutions of the image are equal to each other or not, and converting the longitudinal and lateral resolutions to predetermined specific resolutions, respectively, when the longitudinal and lateral resolutions are different from each other; an inclination correcting step of correcting an inclination of the image having the resolution converted in the first resolution converting step by rotating the image by a predetermined angle; and a second resolution converting step of performing resolution conversion on the image subjected to the inclination correction in the inclination correcting step to convert the longitudinal and lateral resolutions converted in the first resolution converting step to the original resolutions, respectively.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a specific example of an image subjected to resolution converting processing.

FIG. 6 shows a specific example of an image subjected to rotating processing.

FIG. 7 shows a specific example of an image subjected to resolution converting processing for restoring a resolution to an original resolution.

DESCRIPTION OF THE PREFERRED EMBODIMENTS

Embodiments of the invention will now be described with reference to the drawings. In the following description, the same parts and components are indicated by the same reference numbers. The same parts and components bear the same names and achieve the same functions. Accordingly, description thereof is not repeated.

Figure 1:
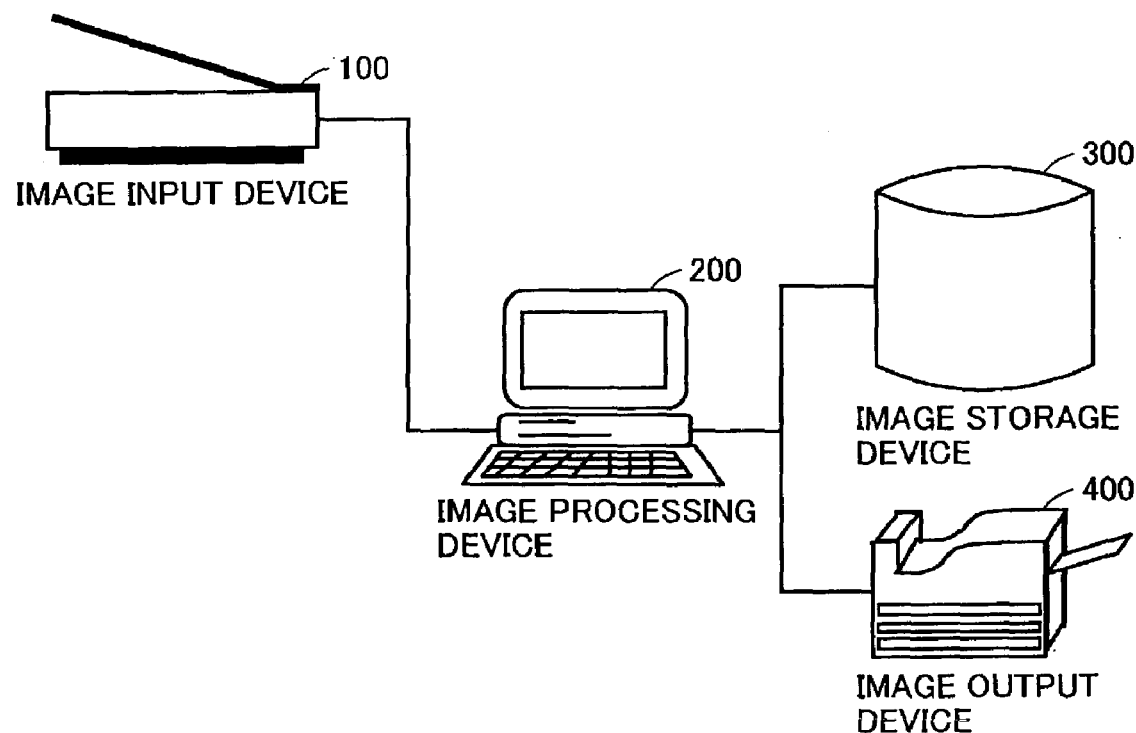
FIG. 1 shows a specific example of a structure of an image processing system of an embodiment of the invention.

Referring to FIG. 1, an image processing system according to an embodiment includes an image input device 100, an image processing device 200, an image storage device 300 and an image output device 400, which transmit data to/from each other via communication lines.

Image input device 100 such as a scanner takes in an image data, and sends it to image processing device 200 such as a computer. Image processing device 200 effects appropriate processing such as inclination correction on the image data, and the image data is stored in image storage device 300 such as a hard disk. Alternatively, the image is sent to image output device 400 such as a printer, and is output from image output device 400.

The image processing system of this embodiment will be described as a system having the four device s shown in FIG. 1. However, it is not necessary that these four device s are independent of each other. For example, these four device s may be contained in a single device such as a facsimile machine, a scanner, a copying machine or a MFP (Multi-Function Peripheral).

Figure 2:
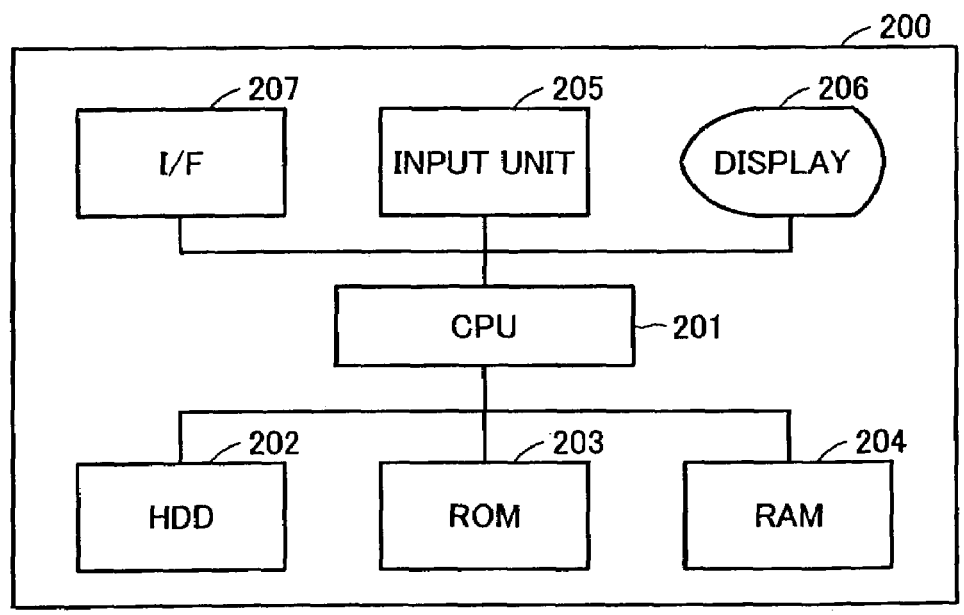
FIG. 2 is a block diagram illustrating a structure of an image processing device 200 shown in FIG. 1.

As shown in FIG. 2, image processing device 200 is controlled by a CPU (Central Processing Unit) 201 to process the image data, which is received via an I/F (interface) 207 from image input device 100. Also, image processing device 200 provides the processed image data to image storage device 300 or image output device 400.

CPU 201 executes a program stored in a storage portion, i.e., a HDD (Hard Disk Drive) 202 or a ROM (Read Only Memory) 203. A RAM (Random Access Memory) 204 provides a temporary work area when CPU 201 executes the program. RAM 204 also provides a memory area, which is a temporary storage area in the following processing. A user enters information and instructions via an input unit 205 such as a keyboard and/or a mouse. A display 206 displays an image received from image input device 100 as well as results of processing of the image. FIG. 2 shows a general structure of a personal computer, and the structure of image processing device 200 is not restricted to the structure shown in FIG. 2.

Figure 3:
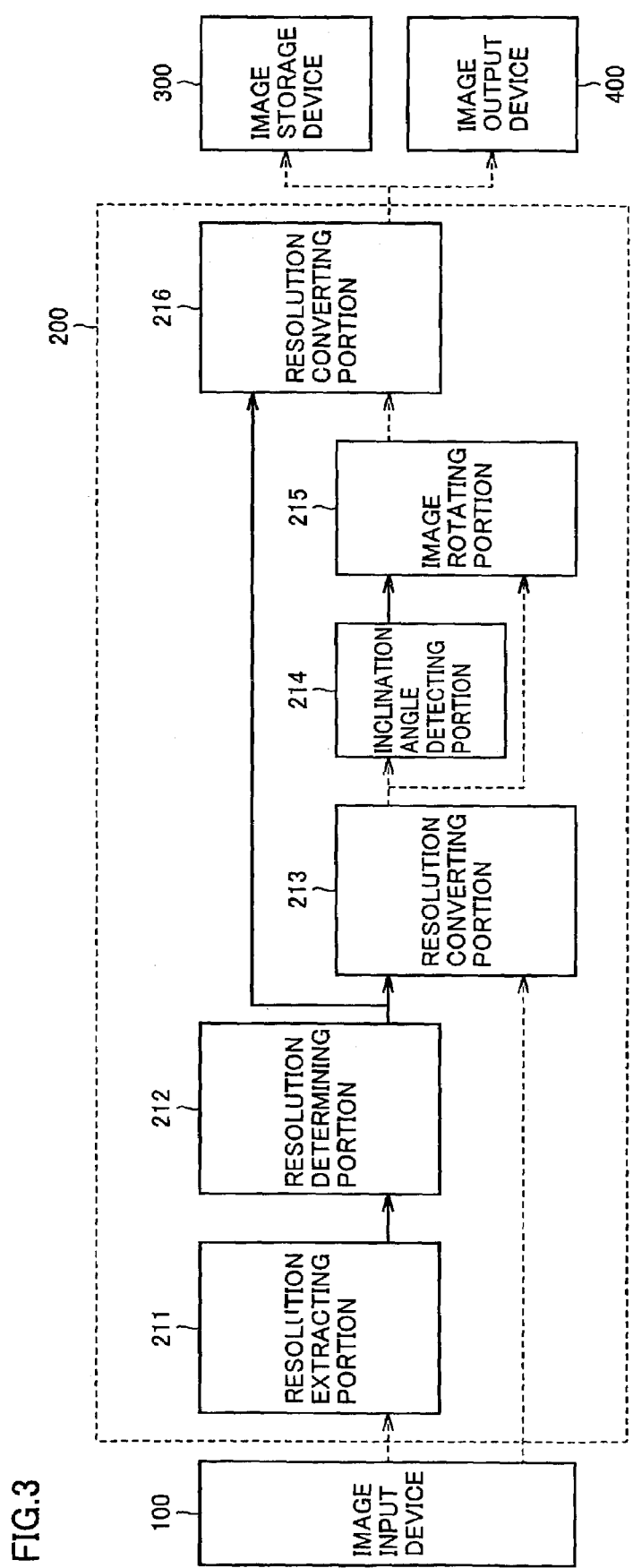
FIG. 3 is a functional block diagram of image processing device 200 illustrated in FIG. 2.

FIG. 3 is a functional block diagram of image processing device 200 shown in FIG. 2, and illustrates a flow of data in image processing device 200. In FIG. 3, dotted lines with arrows indicate the flow of image data, and solid lines with arrows indicate the flow of other data.

Referring to FIG. 3, the image data sent from image input device 100 is taken into image processing device 200 via I/F 207, and is sent to a resolution extracting portion 211 and a first resolution converting portion 213.

Resolution extracting portion 211 extracts longitudinal and lateral resolutions of the image based on the image data received from I/F 207. Resolution extracting portion 211 sends the resolution data thus extracted to a resolution determining portion 212.

Resolution determining portion 212 determines from the resolution data received from resolution extracting portion 211 whether the longitudinal and lateral resolutions are equal to each other. Resolution determining portion 212 sends results of the determination, as the resolution determination data, to first and second resolution converting portions 213 and 216.

When the longitudinal and lateral resolutions of the image are equal to each other according to the resolution determination data received from resolution determining portion 212, first resolution converting portion 213 sends the image data, which is received from I/F 207, to an inclination angle detecting portion 214 and an image rotating portion 215 as it is.

When the longitudinal and lateral resolutions are different from each other, first resolution converting portion 213 performs resolution converting processing on the image data received from I/F 207. First resolution converting portion 213 sends the image data subjected to the resolution converting processing to inclination angle detecting portion 214 and image rotating portion 215.

Inclination angle detecting portion 214 analyzes the image data received from first resolution converting portion 213, and detects the inclination angle of the image. Inclination angle detecting portion 214 sends the detected inclination angle as inclination angle data to image rotating portion 215.

Image rotating portion 215 rotates the image data received from first resolution converting portion 213 based on the inclination angle data received from inclination angle detecting portion 214. By this processing, image rotating portion 215 corrects the image to eliminate the inclination due to rotation of the image. Image rotating portion 215 sends the image data subjected to the inclination correction to second resolution converting portion 216.

Second resolution converting portion 216 performs resolution converting processing to restore the resolution of the image data, which is received from image rotating portion 215 and is already subjected to the inclination correction, based on the resolution determination data received from resolution determining portion 212. Second resolution converting portion 216 sends the image data subjected to the resolution converting processing to image storage device 300 or image output device 400.

Figure 4:
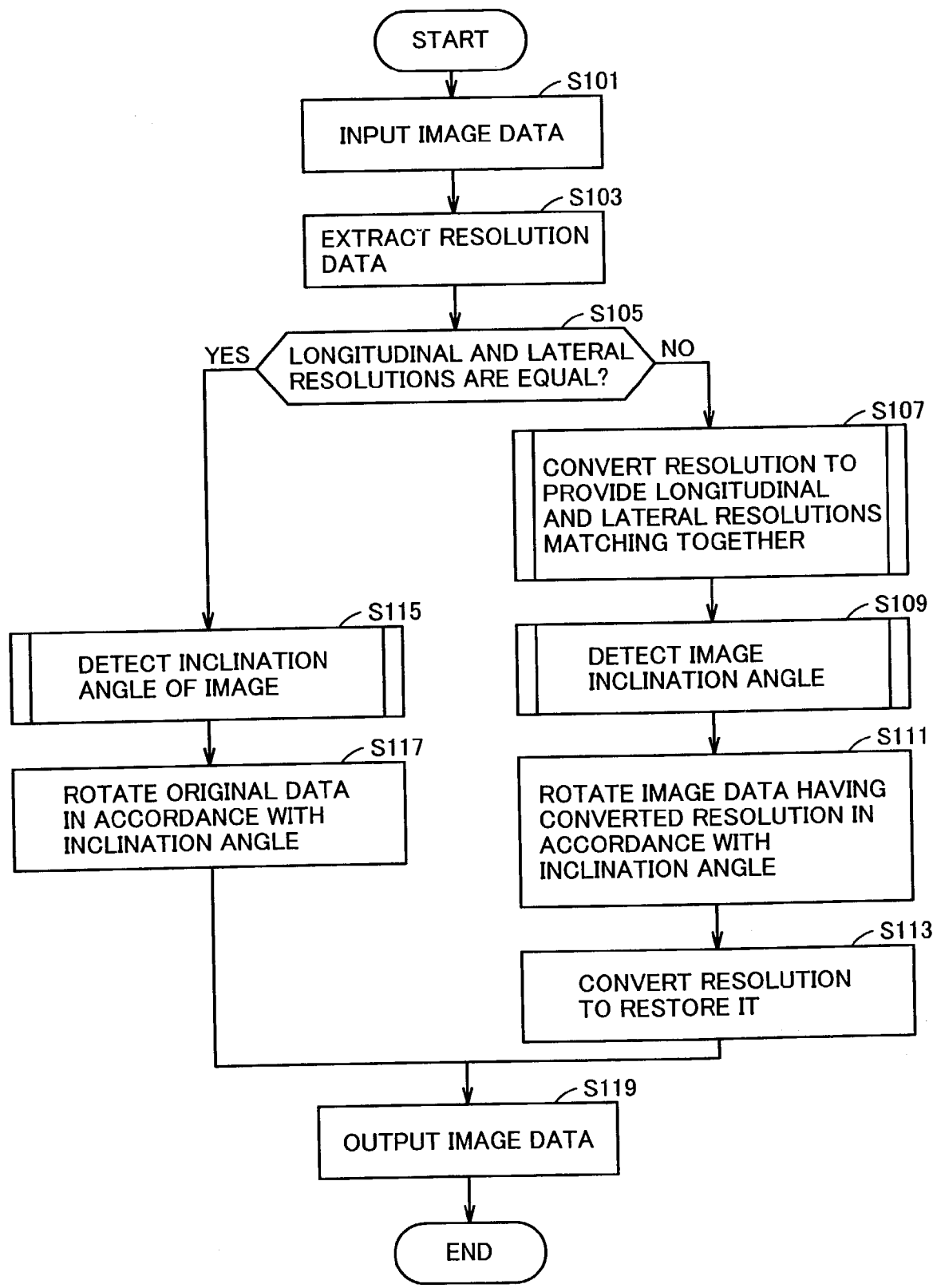
FIG. 4 is a flowchart illustrating an inclination correcting processing according to the invention.

FIG. 4 is a flowchart illustrating the inclination correcting processing according to the invention. For achieving the processing illustrated in the flowchart of FIG. 4, CPU 201 in image processing device 200 reads a program stored on HDD 202 or ROM 203, and operates respective portions in image processing device 200 shown in FIG. 3 to perform the functions.

Referring to FIG. 4, the image data read by image input device 100 is first input via I/F 207 (S101).

Resolution extracting portion 211 extracts the resolution data from the image data (which will be referred to as an "original image" hereinafter) supplied in step S101 (S103). The longitudinal and lateral resolutions of the image are usually described in a header of a file. In step S103, resolution extracting portion 211 reads information described in the header of the file of the image data so that it can extract the resolution data of the image. The resolution data may be extracted in another manner. The manner of extracting the resolution data is not restricted to the manner using resolution extracting portion 211 in step S103 according to the invention.

Then, based on the resolution data extracted in step S103, resolution determining portion 212 determines whether the longitudinal and lateral resolutions of the image match with each other or not (S105). When the longitudinal and lateral resolutions of the image do not match with each (NO in S105), first resolution converting portion 213 executes the resolution converting processing on the original image data to match the resolutions (S107). The resolution converting processing in step S107 may be performed in various manners. The manner is not restricted according to the invention. More specific processing in step S107 will be described with reference to a subroutine.

Then, inclination angle detecting portion 214 detects the inclination of the image, which was subjected to the resolution converting processing in step S107 to have the longitudinal and lateral resolutions equal to each other. Various manners may be employed for detecting the inclination in step S109. The manner for the inclination detection is not restricted. For example, a detecting manner disclosed in Japanese Patent Laying-Open No. 57-69372 may be used. The processing in step S109 will be specifically described with reference to a subroutine thereof.

Image rotating portion 215 rotates the image data, which was subjected to the resolution converting processing in step S107 to have the longitudinal and lateral resolutions equal to each other, in accordance with the inclination angle detected in step S109 (S111). Instep S111, image rotating portion 215 rotates the image data, which has the longitudinal and lateral resolutions equal to each other, by an angle equal to the inclination angle detected in step S109 in a direction opposite to the inclination angle detected in step S109. Various manners may be employed for rotating the image in step S111. The manner for it is not restricted. For example, such a general manner may be employed that positions of pixels of the original image corresponding to the respective pixels of the rotated image are determined, and the image data of the rotated image is obtained by determining the relationships between pixel values of the rotated image and those of the original image. Interpolation processing may be performed when calculating the pixel values of the rotated image in step S111 so that jaggies of characters and lines can be prevented.

Then, second resolution converting portion 216 performs resolution converting processing for restoring the longitudinal and lateral resolutions of the image data rotated in step S111 to the original resolutions based on the resolution data extracted in step S103 (S113). The resolution converting processing in step S113 may be performed in a manner similar to that of the resolution converting processing in step S107. The resolution converting processing in step S113 may be performed such that the resolutions of the image data rotated in step S111 are not necessarily restored to the original resolutions, but are changed to intended resolutions, which are set by a user.

In foregoing step S105, resolution determining portion 212 may determine that the image provided in step S101 has the longitudinal and lateral resolutions equal to each other (YES in S105), in which case inclination angle detecting portion 214 detects the inclination of the original image (S115). A manner of detecting the inclination in step S115 may be similar to that in step S109.

Then, image rotating portion 215 rotates the original image data based on the inclination angle detected in step S113 (S117). A manner of rotating the image in step S117 may be similar to that in step S111.

The image data subjected to the inclination correcting processing is provided via I/F 207 to image storage device 300 or image output device 400 (S119), and the processing ends.

Figures 5, 6:
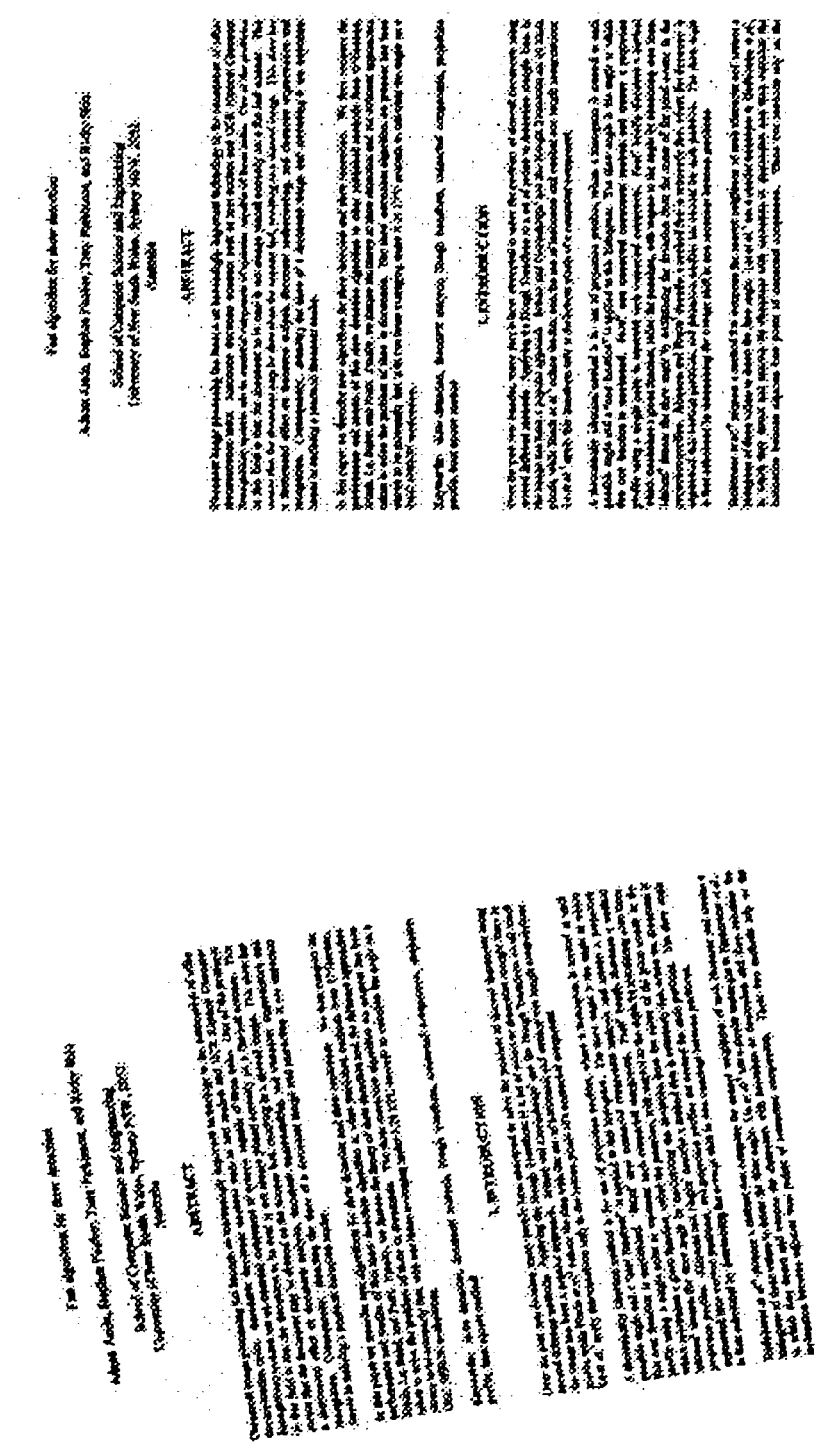
Figure 7:
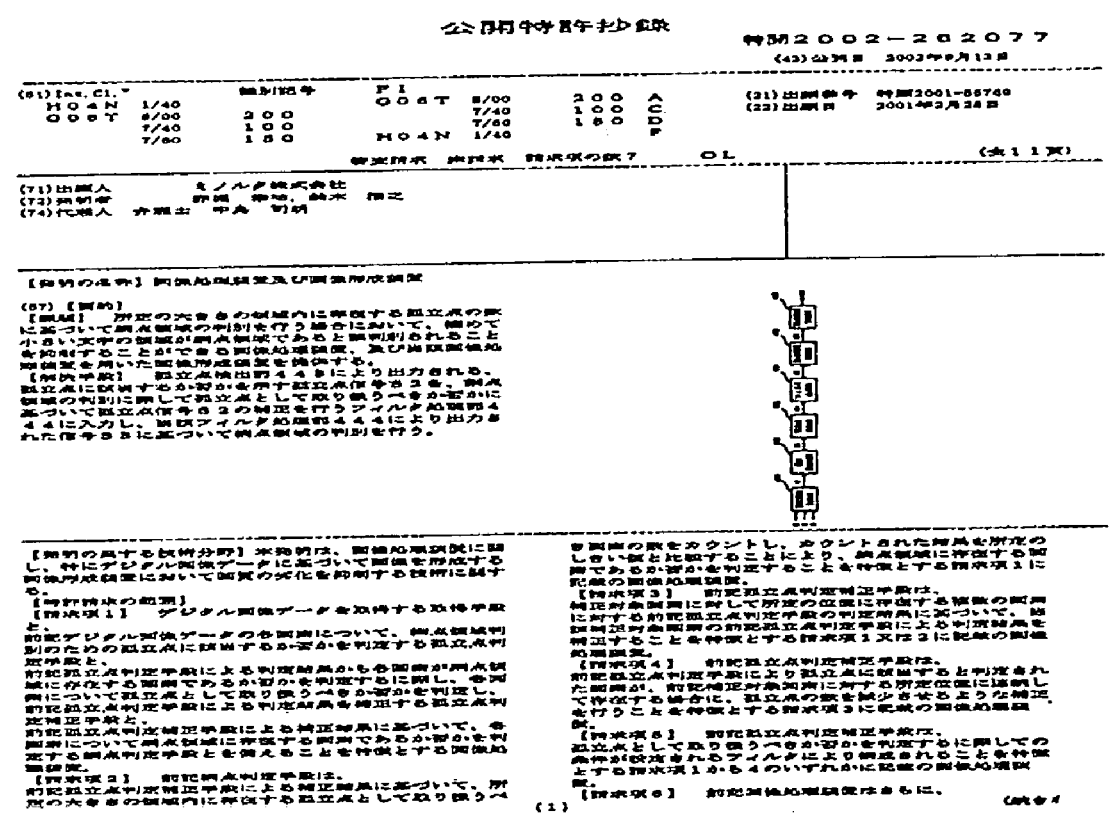
Figure 24:
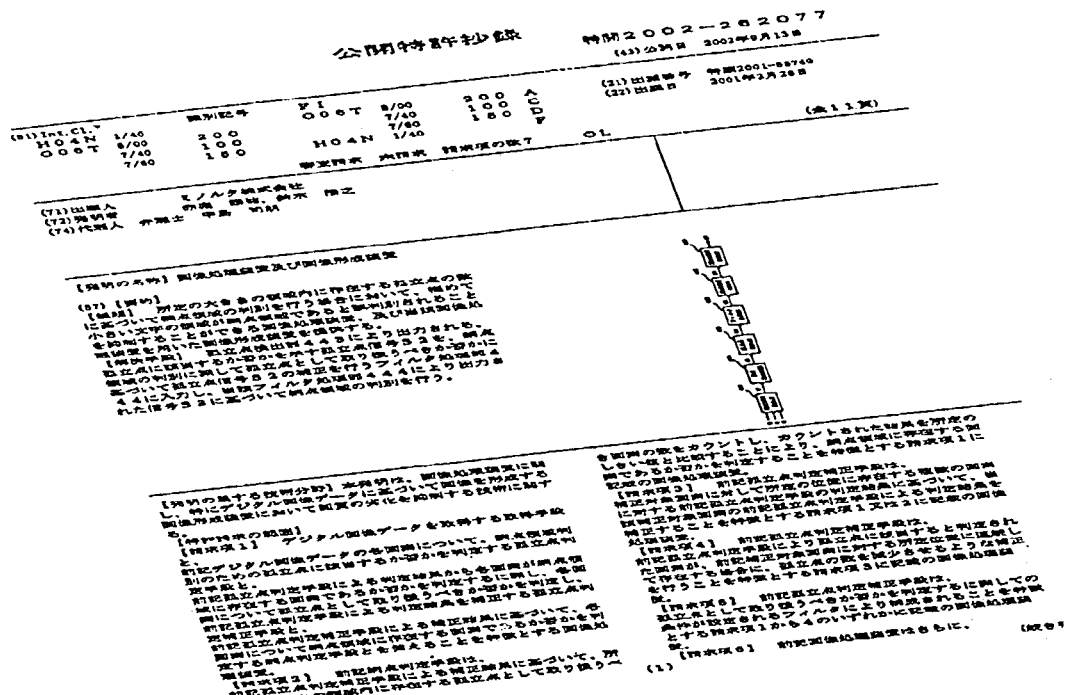
FIG. 24 shows a specific example of an inclined image having longitudinal and lateral resolutions different from each other.
Figure 25:
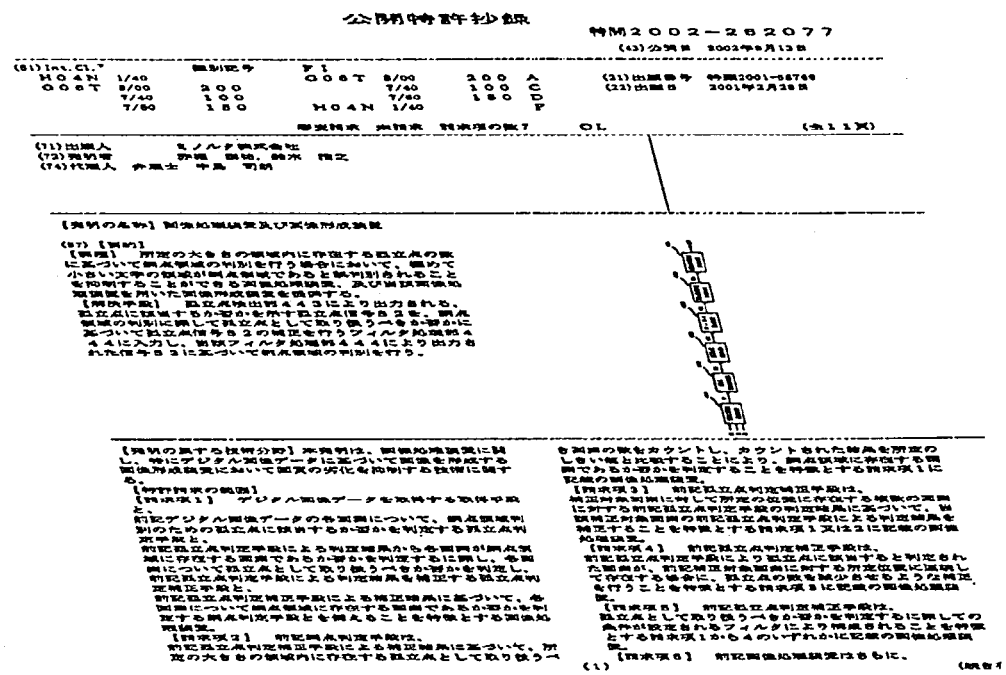
FIG. 25 shows a specific example of an image produced by effecting a conventional inclination correcting processing on an inclined image having longitudinal and lateral resolutions different from each other.

Image processing device 200 in this embodiment executes the inclination correcting processing described above. Thereby, when inclined image data having longitudinal and lateral resolutions different from each other as shown in FIG. 24 is input, the resolution converting processing is executed to match the longitudinal and lateral resolutions with each other in step S107, and thereby provides the converted image shown in FIG. 5. In step S111, the image shown in FIG. 5 is rotated to convert it to the image shown in FIG. 6. In step S113, the resolution converting processing is executed to restore the resolution of the image shown in FIG. 6 to the original resolutions so that the converted image shown in FIG. 7 is obtained.

By employing the processing method described above, even when the input image has the longitudinal and lateral resolutions different from each other, the inclination correction can be performed by correctly detecting the inclination angle. By applying the processing method described above, it is possible to achieve good correction results without impairing the image quality as compared with a method, in which an inclination of an image in one direction is corrected, and then an inclination in another direction is corrected by shifting the image.

Figure 8:
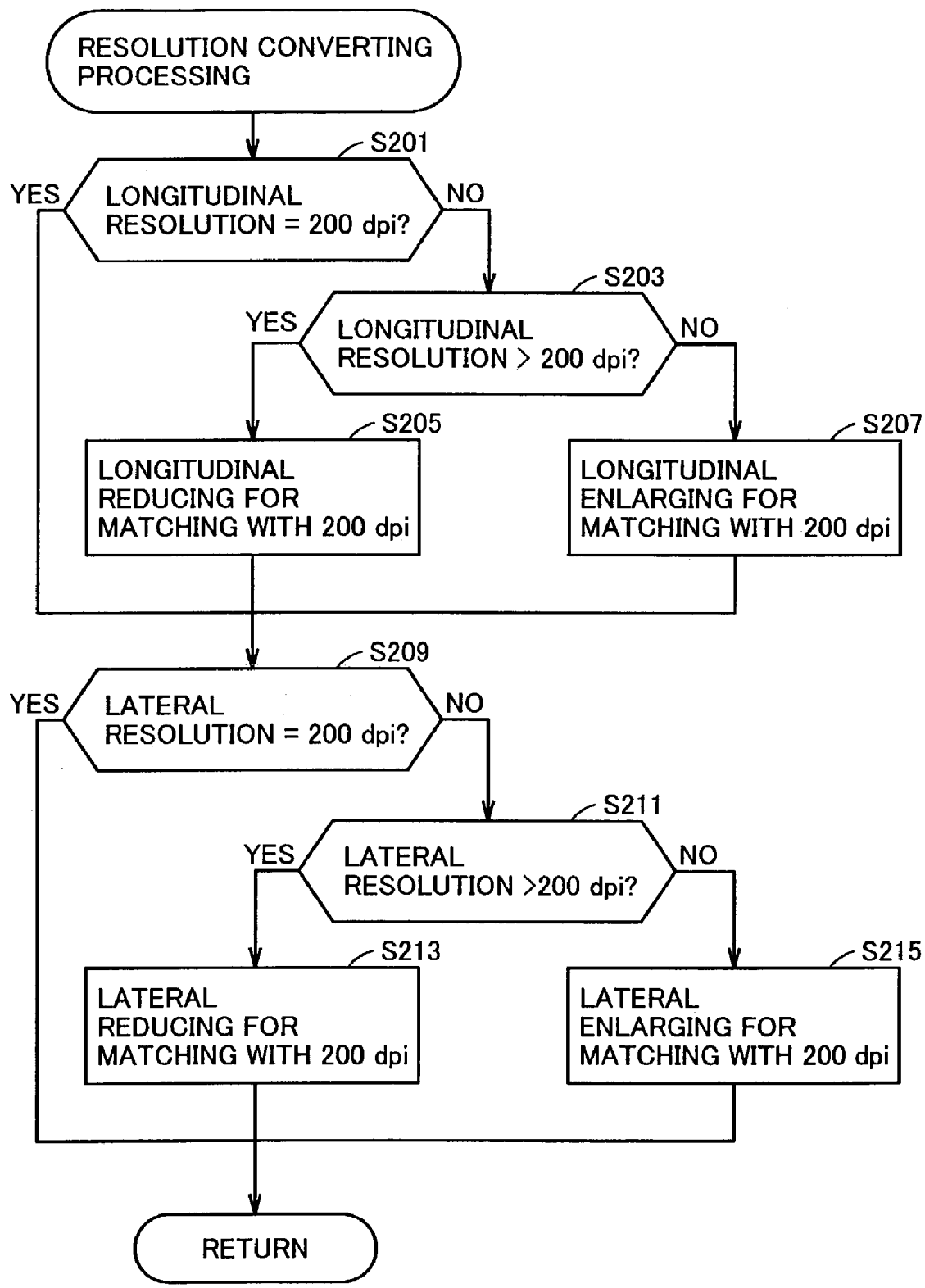
FIG. 8 is a flowchart illustrating a specific example of resolution converting processing in a step S107.

An example of the resolution converting processing in step S107 is illustrated in a flowchart of FIG. 8.

Referring to FIG. 8, first resolution converting portion 213 first determines whether the longitudinal resolution of the original image is equal to a preset resolution, e.g., of 200 dpi or not (S201).

When the longitudinal resolution of the original image is equal to the preset resolution (YES in S201), first resolution converting portion 213 does not perform the converting processing for the longitudinal direction of the original image, and an operation moves to a step S209.

When the longitudinal resolution of the original image is different from the preset resolution (NO in S201), first resolution converting portion 213 enlarges or reduces the original image in the longitudinal direction of the original image based on the relationship in magnitude between the longitudinal resolution of the original image and the preset resolution (S203) to match the longitudinal resolution of the original image with the preset resolution (S205 or S207).

Further, first resolution converting portion 213 determines whether the lateral resolution of the original image is equal to the preset resolution or not (S209).

When the lateral resolution of the original image is equal to the preset resolution (YES in S209), first resolution converting portion 213 does not perform the converting processing for the lateral direction of the original image, and terminates the processing.

When the lateral resolution of the original image is different from the preset resolution (NO in S209), first resolution converting portion 213 enlarges or reduces the image in the lateral direction of the original image based on the relationship in magnitude between the lateral resolution of the original image and the preset resolution (S211) to match the lateral resolution of the original image with the preset resolution (S213 or S215).

The enlarging and reducing processing in foregoing steps S205, S207, S213 and S215 may be performed in a general method such as a nearest neighbor method or a linear interpolation method.

Since image processing device 200 of the embodiment performs the foregoing resolution converting processing in step S107, the original image having the resolutions, e.g., of 300 dpi×150 dpi are changed to have the resolutions of 200 dpi×200 dpi, i.e., the longitudinal and lateral resolutions equal to each other, when the resolution providing the reference is preset to 200 dpi.

In the flowchart of FIG. 8, the resolution converting processing is performed such that the enlarging or reducing processing is performed to provide the longitudinal and lateral resolutions of the original image matching with the preset resolution (e.g., 200 dpi). In the above processing, however, the enlarging or reducing processing may be performed to match the longitudinal and lateral resolutions of the original image with the preset resolution only when the original image has the longitudinal and lateral resolutions different from each other.

Further, the method of the resolution converting processing according to the invention is not restricted to the method illustrated in FIG. 8. Specific examples of the resolution converting processing are illustrated in FIGS. 9, 10 and 11, respectively.

Figure 9:
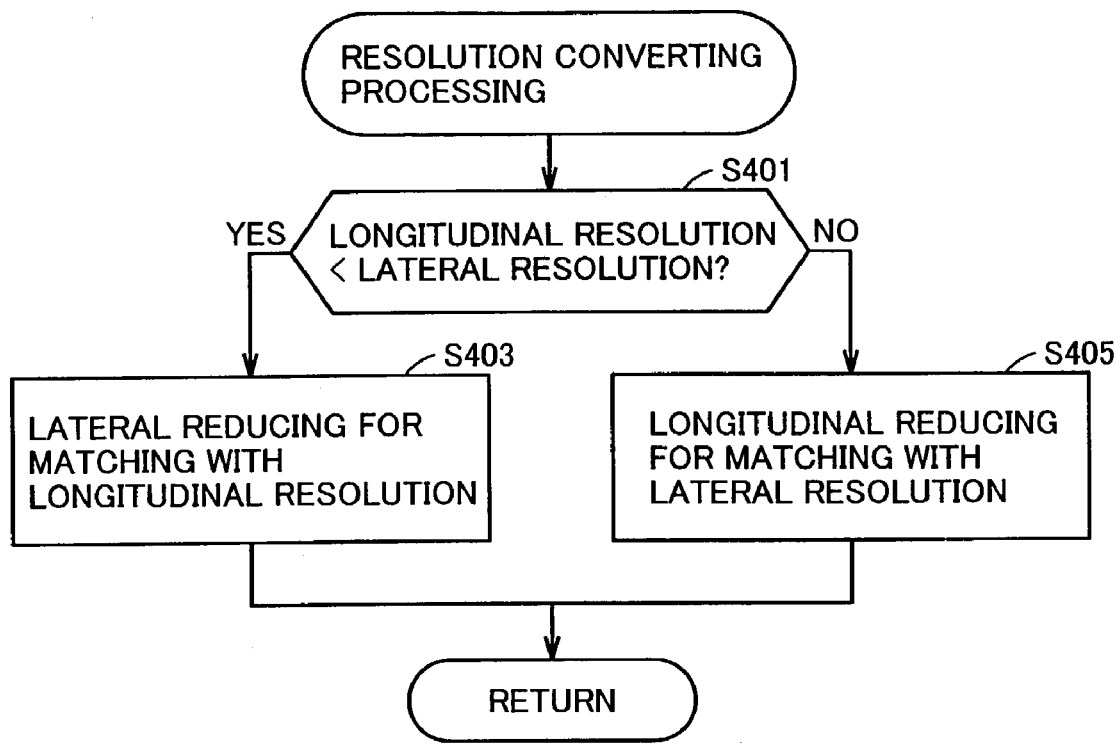
FIG. 9 is a flowchart illustrating another specific example of the resolution converting processing in step S107.

In another specific method of the resolution converting processing shown in FIG. 9, the longitudinal resolution of the original image is compared with the lateral resolution (S401), and the reducing operation is performed in the direction of the larger resolution of the original image to match the resolution, which was originally large, with the smaller resolution (S403 or S405).

Figure 10:
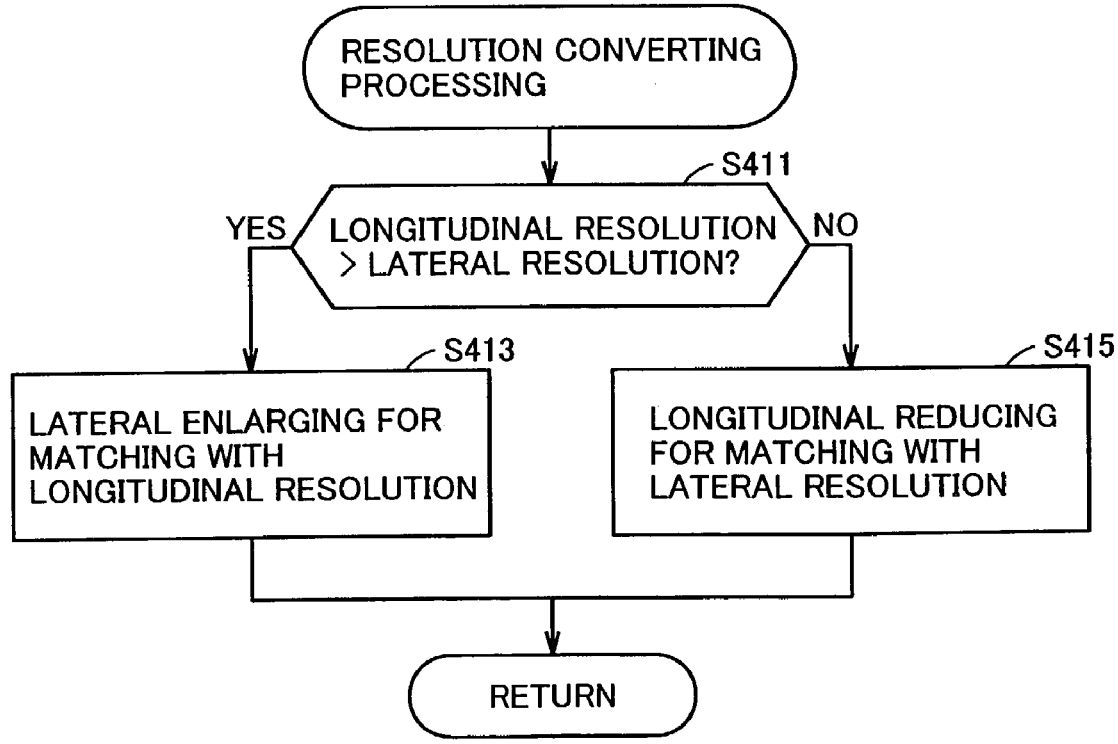
FIG. 10 is a flowchart illustrating still another specific example of the resolution converting processing in step S107.
Figure 11:
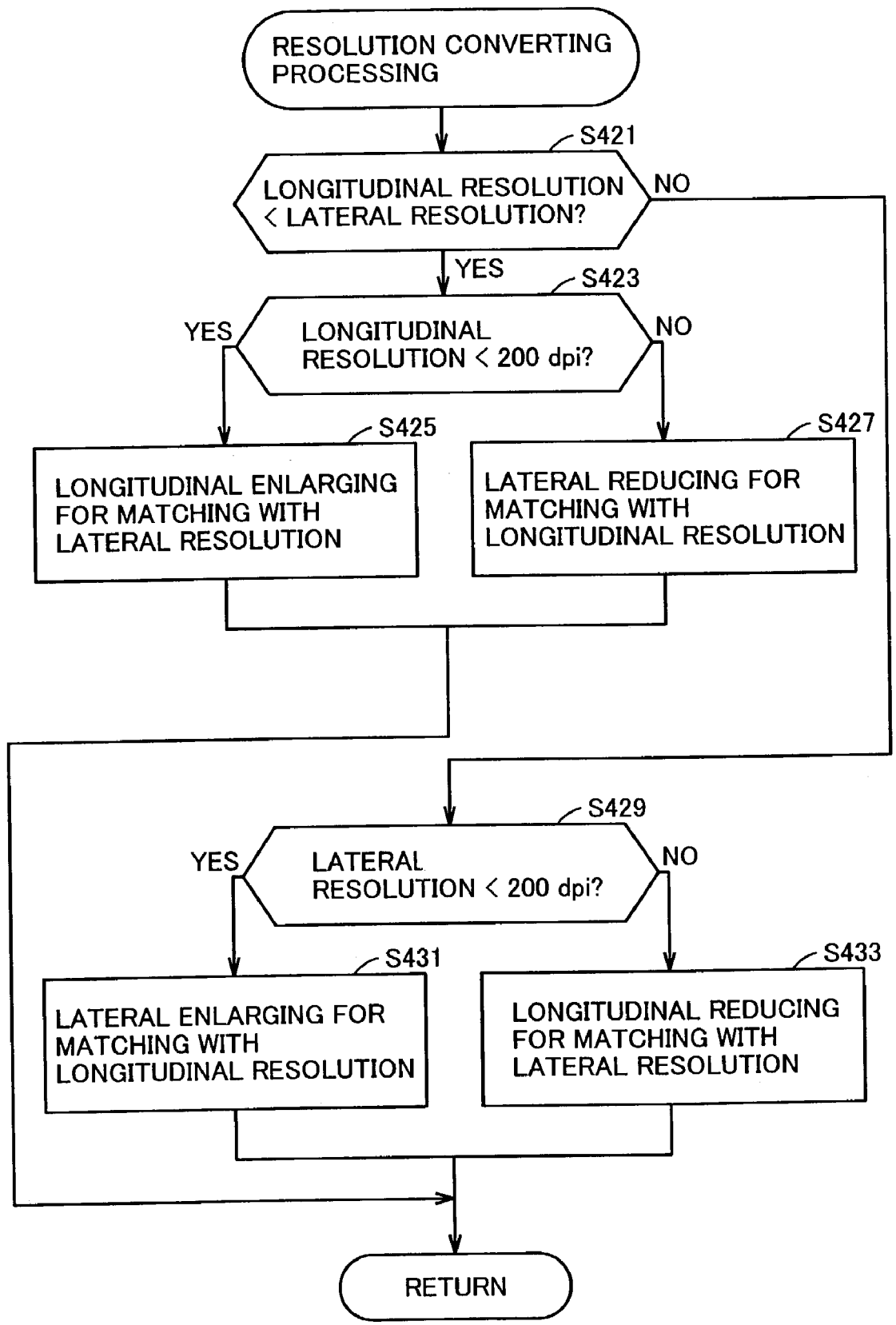
FIG. 11 is a flowchart illustrating yet another specific example of the resolution converting processing in step S107.

In still another specific method of the resolution converting processing shown in FIG. 10, the longitudinal resolution of the original image is compared with the lateral resolution (S411), and the enlarging processing is performed in the direction of the smaller resolution of the original image to match the resolution, which was originally small, with the larger resolution (S413 or S415).

According to the resolution converting processing, where is performed as illustrated in FIGS. 9 and 10 by image processing device 200 of this embodiment, the resolution converting processing is performed only in one, i.e., longitudinal or lateral direction of the original image, whereby the original image is changed to have the longitudinal and lateral resolutions equal to each other. However, if the resolution converting processing is always performed to match the longitudinal or lateral resolution with the smaller resolution, the converted image may have an excessively small resolution so that the precision of inclination detection may be low. Conversely, if the resolution converting processing is always performed to match the longitudinal or lateral resolution with the larger resolution, the converted image may have an excessively large resolution so that the inclination correcting processing may take an excessively long time. Therefore, further another method of the resolution converting processing may be employed as illustrated in FIG. 11.

FIG. 11 illustrates further another method of resolution converting processing, in which the longitudinal resolution of the original image is compared with the lateral resolution (S421), and a smaller resolution between the longitudinal and lateral resolutions is compared with a predetermined value, e.g., of 200 dpi (S423 or S429). When the smaller resolution between the longitudinal and lateral resolutions exceeds the predetermined value (NO in S423 or NO in S429), the reducing processing is performed on the original image in the direction of the larger resolution to match the resolution with the smaller resolution (S427 or S433). When the smaller resolution is smaller than a predetermined value (YES in S423 or YES in S429), the enlarging processing is performed on the original image in the direction of the smaller resolution to match the resolution with the larger resolution (S425 or S431).

According to image processing device 200 of the embodiment, which performs the resolution converting processing shown in FIG. 11, the reference resolution may be set to 200 dpi, in which case the original image, e.g., of 300 dpi×150 dpi is converted to the image of 300 dpi×300 dpi, and the original image of 300 dpi×250 dpi is converted to the image of 250 dpi×250 dpi. Thus, the original image is converted to have the longitudinal and lateral resolutions equal to each other.

Figure 12:
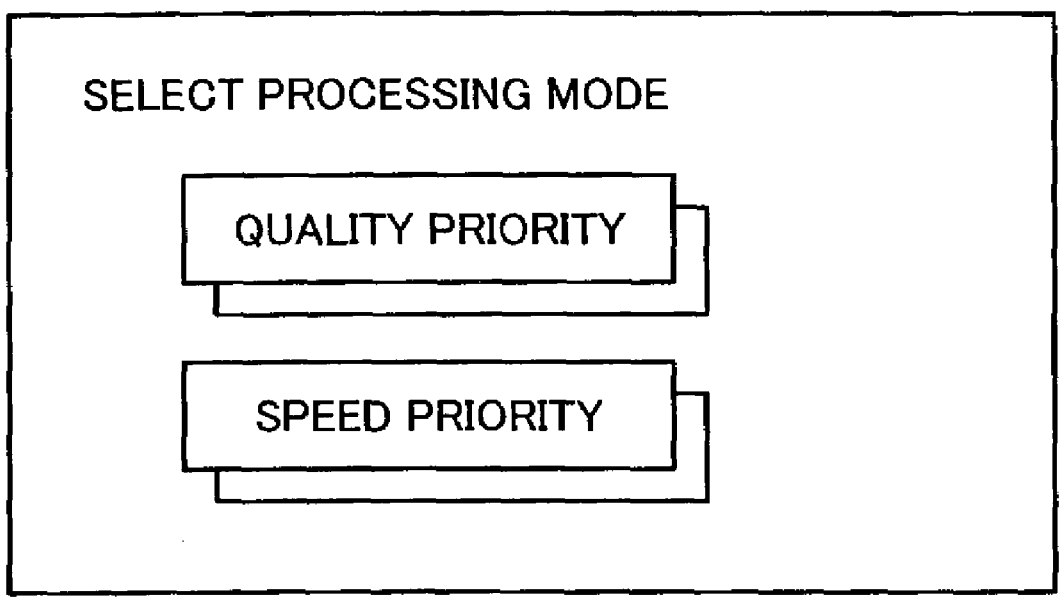
FIG. 12 shows a specific example of GUI for accepting setting of a processing mode by a user.

In general, the processed image can have a better image quality when the enlarging processing is performed in the direction of the smaller resolution to match the resolution with the larger resolution, as compared with the case where the reducing processing is performed in the direction of the larger resolution to match the resolution with the smaller resolution. In the case of the resolution converting processing shown in FIG. 11, GUI (Graphical User Interface), which is human interface and is shown in FIG. 12, is displayed on display 206 or the like for receiving a user's instruction for selecting a process mode from a speed priority mode and an image quality priority mode. When the speed priority mode is selected, the former processing is performed. When the image quality priority mode is selected, the latter processing is performed.

Figure 13:
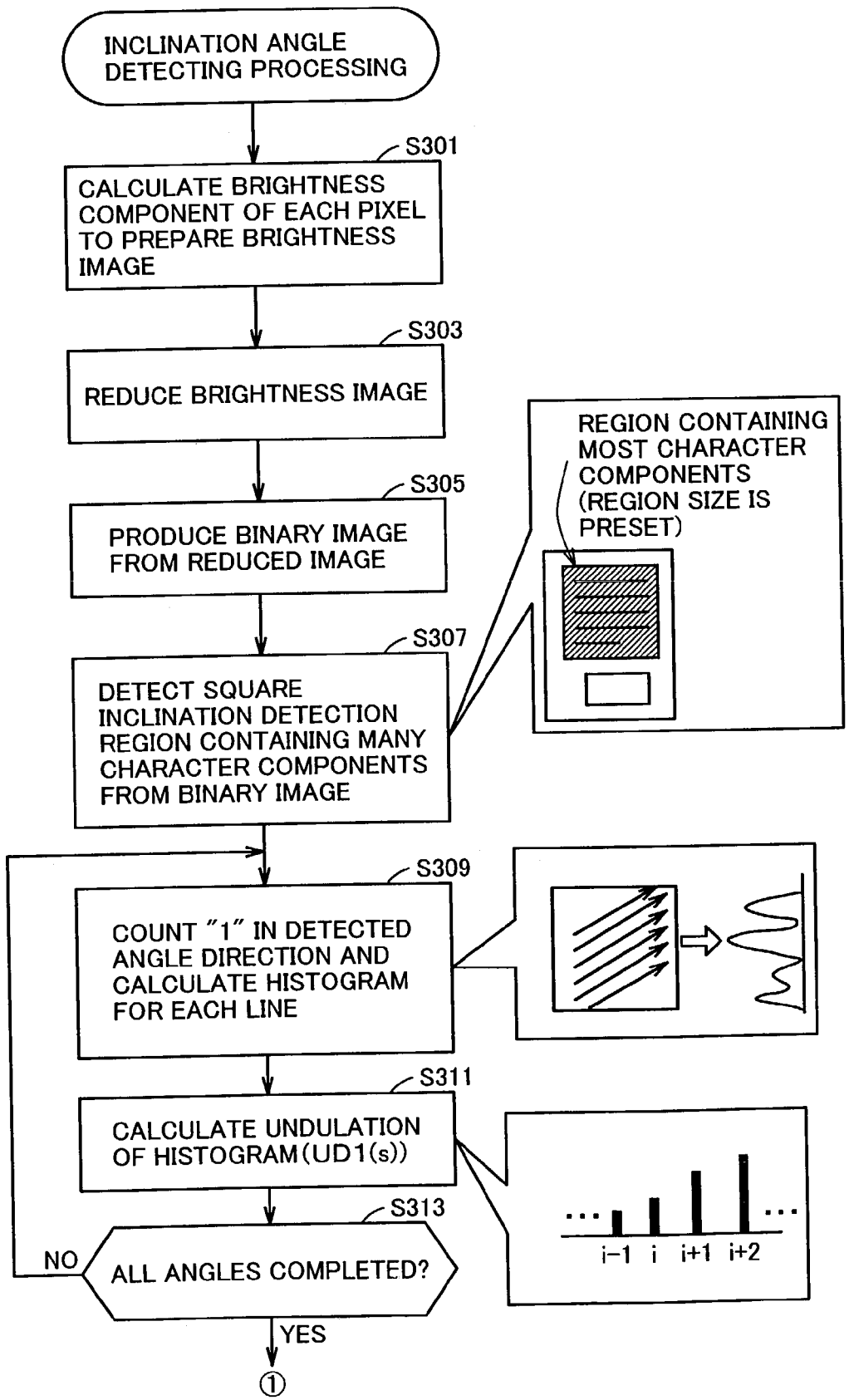
FIG. 13 is a flowchart illustrating inclination detecting processing in a step S109.
Figure 14:
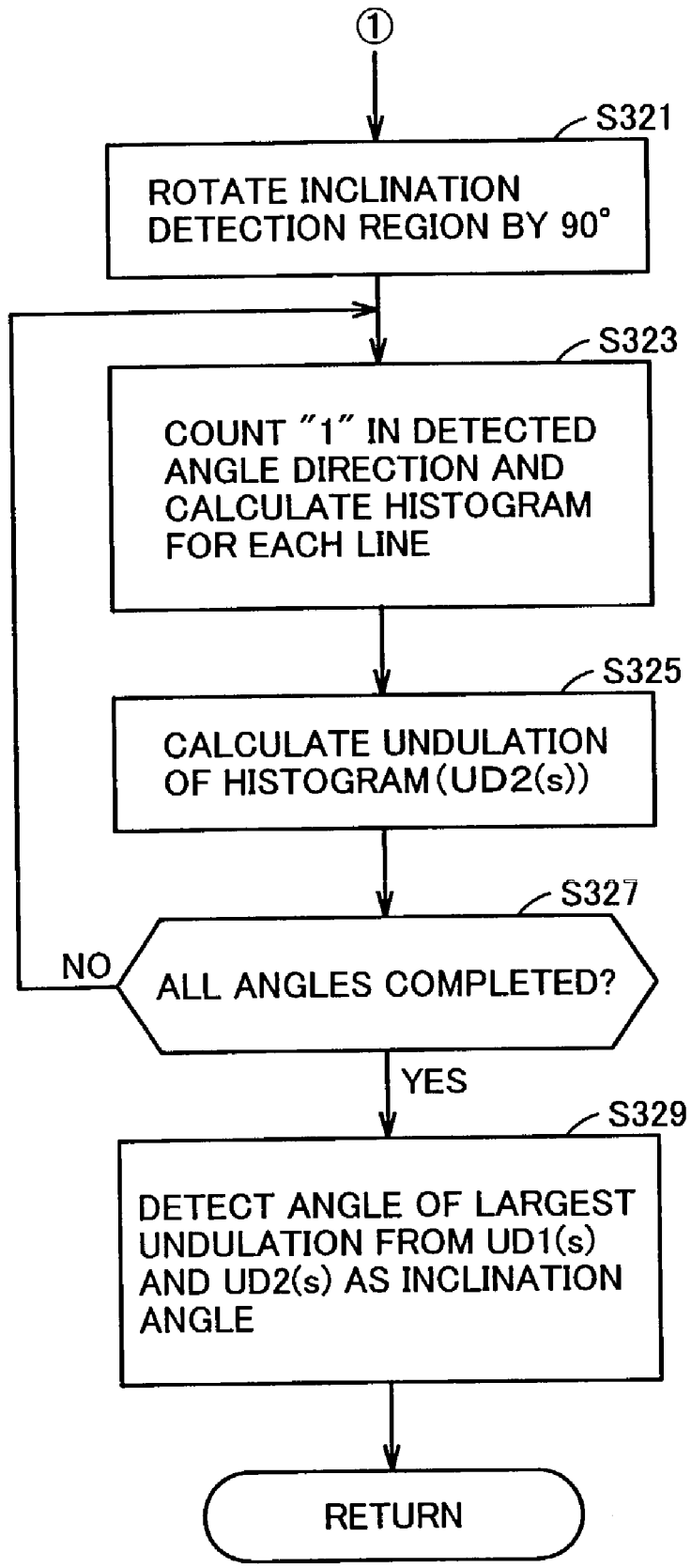
FIG. 14 is a flowchart illustrating the inclination detecting processing in step S109.

An example of the inclination detecting processing in step S109 is illustrated in flowcharts of FIGS. 13 and 14. The inclination detecting processing illustrated in FIGS. 13 and 14 is prepared by slightly modifying the detecting method disclosed in Japanese Patent Laying-Open No. 57-69372.

Referring to FIG. 13, a brightness image is first prepared in inclination angle detecting portion 214 based on the brightness (RGB components) of the original image (S301). A general producing method can be employed for producing the brightness image in step S301, although the method is not described in this specification.

Then, the brightness image produced in step S301 is reduced (S303). Various methods can be employed for the reducing processing in step S303. For example, such a method can be employed that the brightness image produced in step S301 is divided into a plurality of rectangular regions, and each rectangular region is replaced in accordance with an average density value, although not restricted to this method. In this method, it is preferable that the size of the rectangular region is determined based on the resolution and the size of the image. More specifically, it is preferable that the rectangular region has a shorter side of a length from about 500 to about 1000 pixels.

Then, inclination angle detecting portion 214 performs binarizing processing on the brightness image reduced in step S303 with a specific threshold value, and thereby produces a binary image formed of background pixels of "0" and foreground pixels of "1" (S305). The binarizing processing in step S305 is executed in such a manner that edge pixels forming edge components included in the brightness image are detected with an operator (filter) such as Sobel operator, and binarization is performed with a threshold formed of an average of the brightness corresponding to all the detected edge pixels. This method utilizes such properties or characteristics that the brightness value forming the threshold of binarization is present in a boundary between characters (or graphics) and a background in many cases. However, a general method such as a p-tile method or a mode method may be used for the binarization.

Then, inclination angle detecting portion 214 extracts a regular square region containing the most character components from the binary image produced in step S305, and determines the region thus extracted as the inclination detection region (S307). In step S307, the regular square region is extracted from the binary image, and may be rotated by 90 degrees, whereby image processing device 200 can perform the inclination correction processing not only on documents including horizontal lines but also on documents including vertical lines, using the same inclination angle detection reference. Further, the size of the inclination detecting region is preferably about 500×500 pixels.

When extracting the regular square region in step S307, it is determined whether the contained components are character components or not. A general region identifying method may be used for this determination. In this embodiment, however, it is preferable to utilize properties that a character region contains many edges, and to extract the regular square region containing the most edge components as the inclination detection region. The edge components are already extracted in step S305 of determining the threshold for binarizing processing. Therefore, the regular square region containing the most edge components already extracted is extracted in step S307, which increases the operation speed.

Then, inclination angle detecting portion 214 counts "1" in each line at the direction of a detected angle s within the inclination detection region extracted in step S307, and a cumulative histogram for each line is calculated (S309). For calculating the cumulative histogram for each line, it is preferable that inclination angle s is nearly within a range of ±10–±15 degrees. In general, it is considered that an inclination outside the above range does not occur. A pitch between the respective detection angles s is preferably equal to about 0.2 degrees.

Further, inclination angle detecting portion 214 calculates the degree UD1(s) of undulation of the histogram at every detection angle s based on the cumulative histogram calculated in step S309 (S311). The degree UD1(s) of undulation of the histogram is obtained by the following formula:

$$UD1(s) = \cdots + |f(i-1) - f(i)| +$$
$$|f(i) - f(i+1)| +$$
$$|f(i+1) - f(i+2)| + \cdots$$

where f(i) represents a cumulative count at ith line.

When inclination angle detecting portion 214 completes the calculation in steps S309 and S311 for all detection angles s (YES in S313), it then rotates the inclination detection region by 90 degrees in a step S321 illustrated in FIG. 14.

Then, inclination angle detecting portion 214 performs the calculation similar to those in steps S309 and S311 already described on the inclination detection regions rotated by 90 degrees in step S312 for all detection angles s (S323–S327), and obtains a degree UD2(s) of undulation for each detection angle s.

Inclination angle detecting portion 214 extracts the maximum value from all degrees UD1(s) and UD2(s) of undulation of the histograms calculated, for respective detection angles s, from the inclination detection region in the original direction and the inclination detection region rotated by 90 degrees. Detection angle s providing the maximum degree of undulation is detected as the image inclination angle (S329).

When image processing device 200 of this embodiment executes the inclination detecting processing described above, the inclination angle can be detected from not only a document containing horizontal lines but also a document containing vertical lines.

The inclination detecting processing illustrated in FIGS. 13 and 14 is predicated on that the original image is a full-color image including RGB components. Description will now be given on a specific example of inclination detecting processing in the case where the original image does not contain the RGB components.

Figure 15:
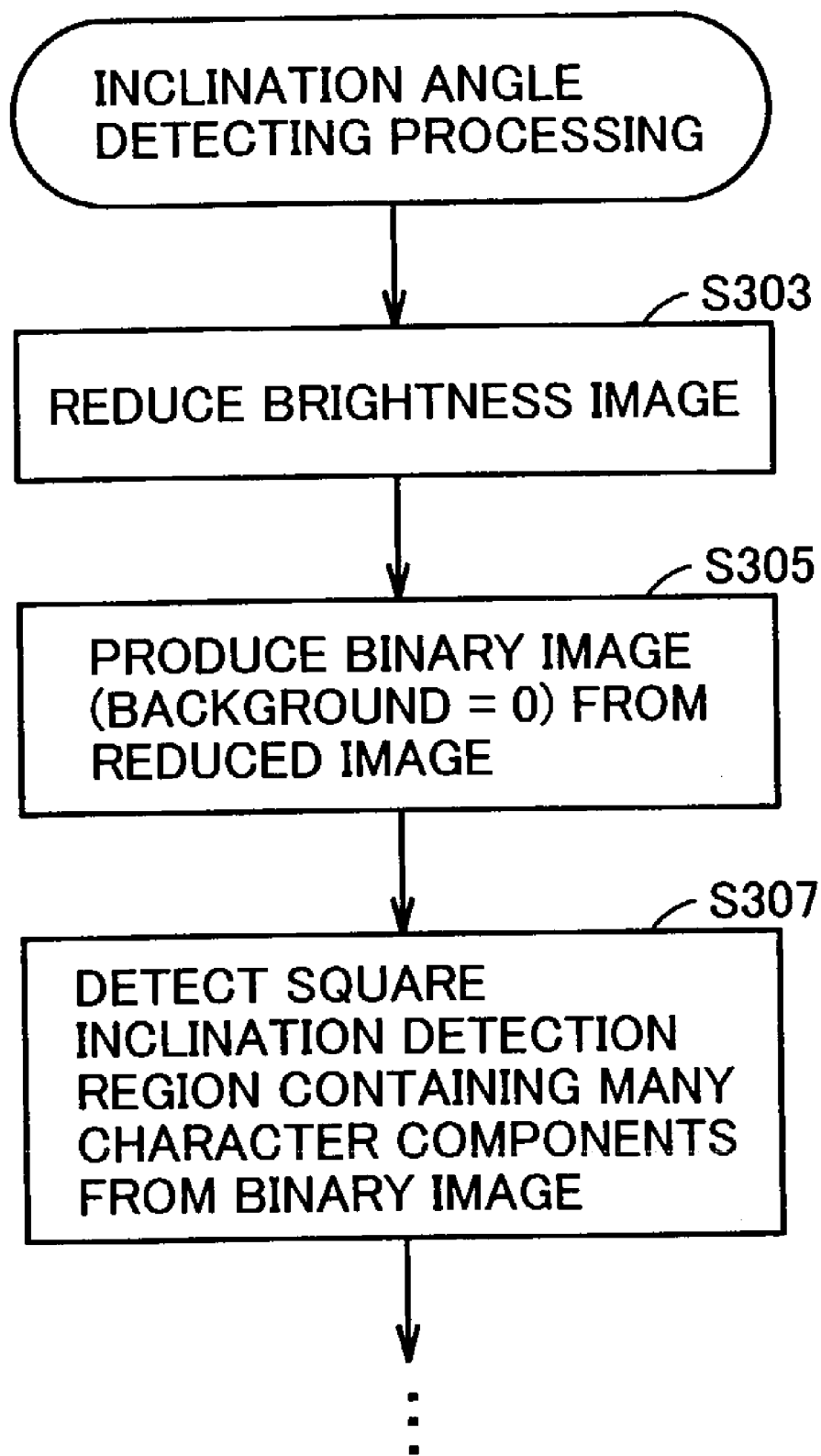
FIG. 15 is a flowchart illustrating the inclination detecting processing in the case where an original image is a grayscale image.

FIG. 15 is a flowchart illustrating the inclination detecting processing for the case where the original image is a gray-scale image. Referring to FIG. 15, when the original image is the gray-scale image, it is not necessary to execute the processing in step S301 illustrated in FIG. 13 for converting the image to the brightness image. The subsequent processing of detecting the inclination for the original image formed of the gray-scale image is similar to that illustrated in FIGS. 13 and 14 performed for the original image containing RGB components.

Figure 16:
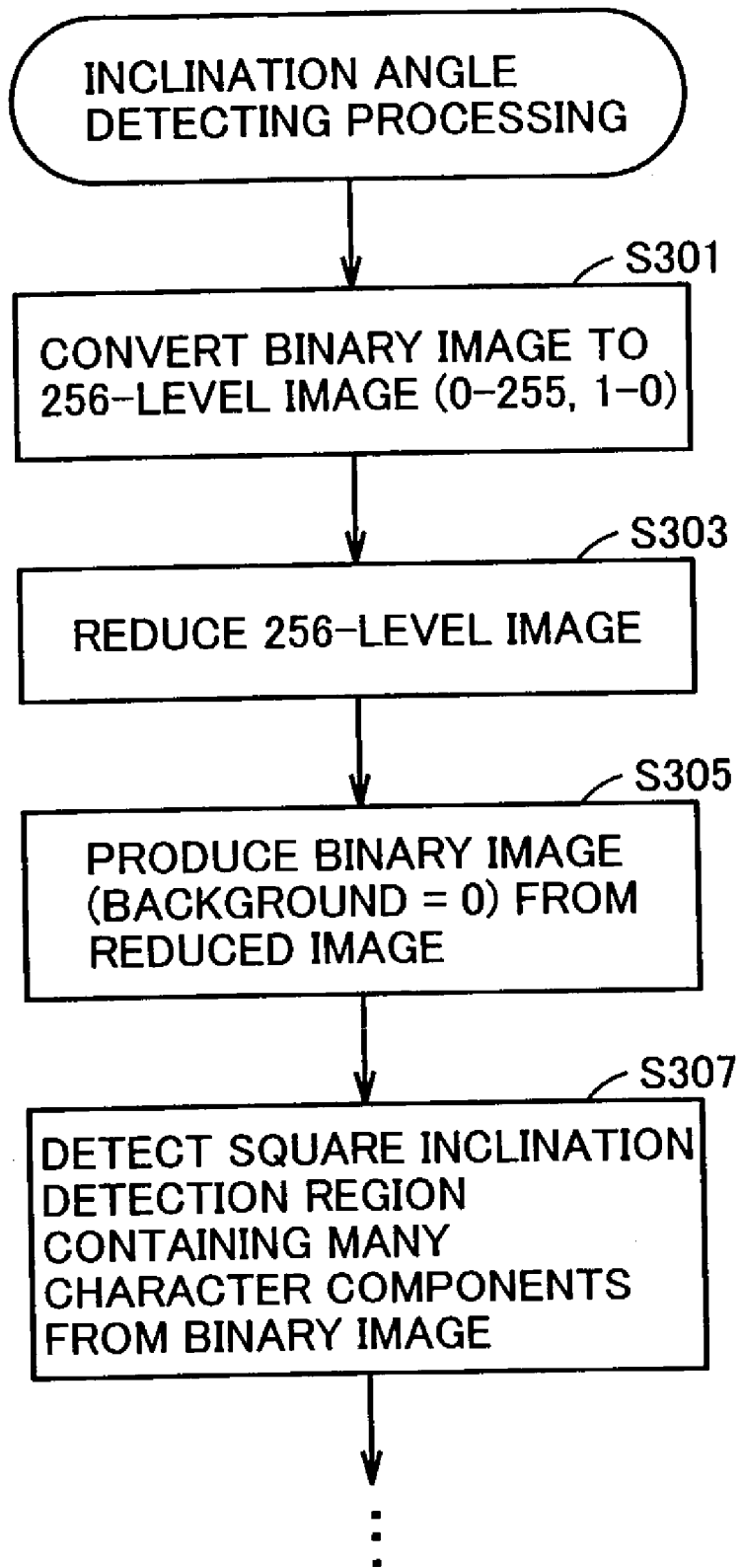
FIG. 16 is a flowchart illustrating the inclination detecting processing in the case where the original image is a monochrome binary image.

FIG. 16 is a flowchart illustrating the inclination detecting processing in the case where the original image is a monochrome binary image. Referring to FIG. 16, when the original image is a monochrome binary image, inclination angle detecting portion 214 converts the original image to a 256-level gray-scale image in step S301 instead of the processing of conversion to the brightness image in step S301 illustrated in FIG. 13. In the subsequent processing of detecting the inclination of the original image formed of the monochrome binary image, the 256-level gray-scale image thus converted is handled similarly to the brightness image, and the reducing processing and edge extracting processing are executed similarly to the processing illustrated in FIGS. 13 and 14.

By executing the inclination detecting processing in image processing device 200 of the embodiment, an inclination can be detected from the original image formed of the gray-scale image as well as the original image formed of the monochrome binary image, similarly to the case where the original image is a full-color image. Since the image reduction can achieve an effect similar to smoothing, the inclination correcting processing can be correctly effected even on the monochrome binary image, in which erroneous detection of an inclination is liable to occur, such as a half-tone image produced by a dithering method, an error diffusion method or the like.

Image processing device 200 of the embodiment is predicated on that, in the image rotating processing in step S111 or S117, memory regions for the two images are prepared in RAM 204 for one original image, and particularly, a region for storing the original image data and a region for storing the rotated image data are prepared. Accordingly, a method of reducing the memory regions to be used will now be described.

Figure 17:
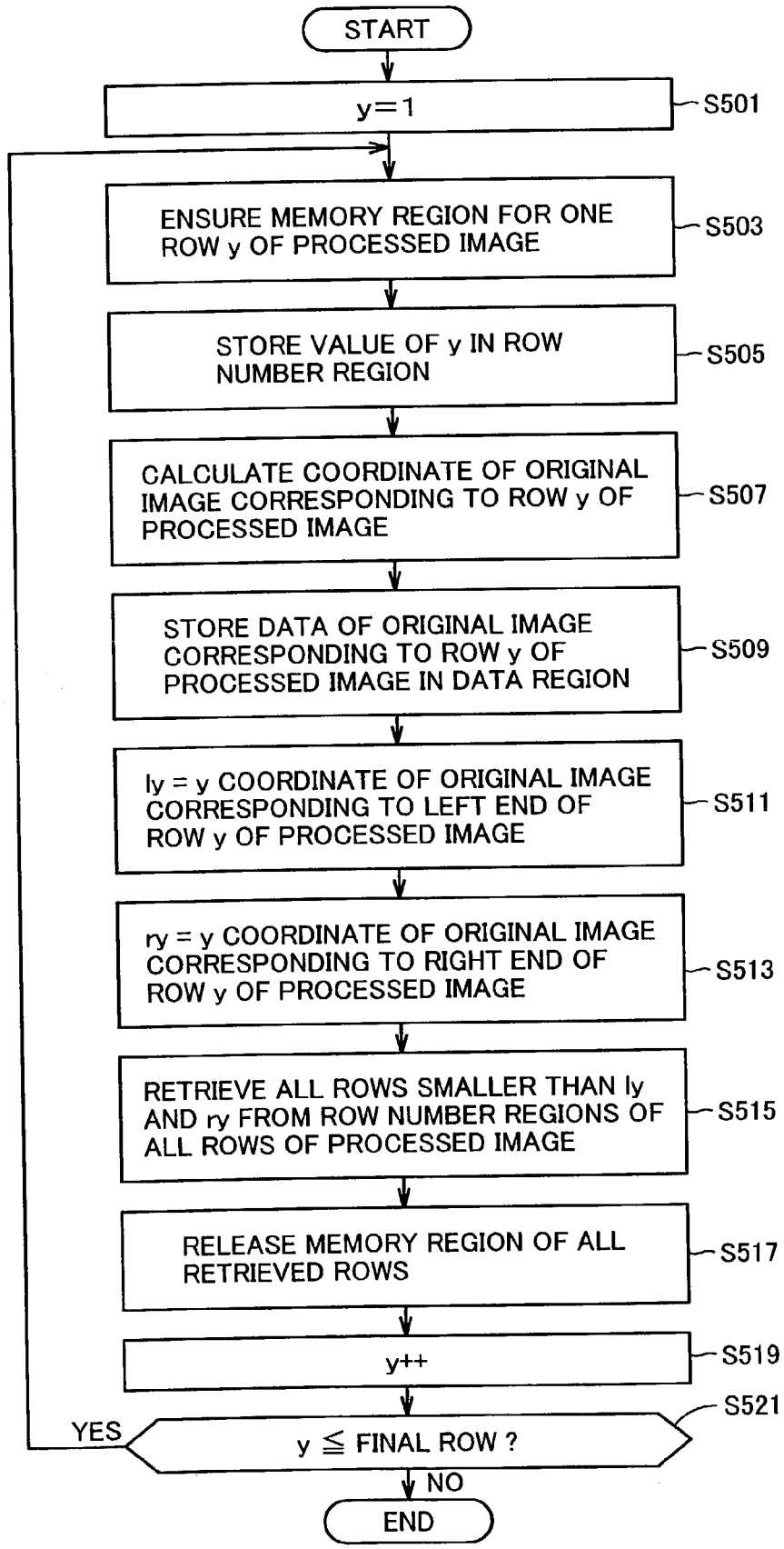
FIG. 17 is a flowchart illustrating memory region allocating processing used in image rotating processing.
Figure 18:
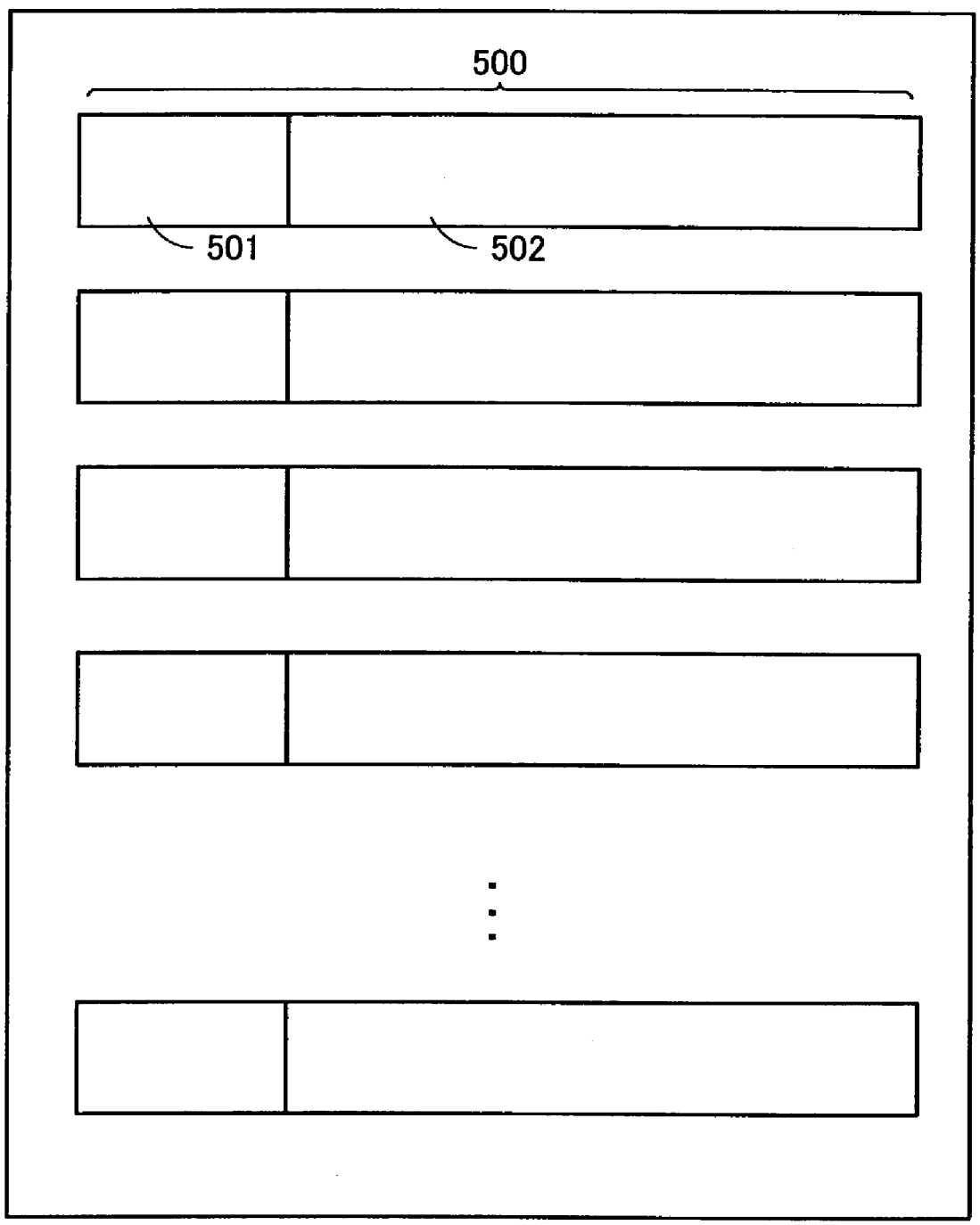
FIG. 18 shows a specific example of memory regions temporarily storing a row y of an image data subjected to rotating processing.

FIG. 17 is a flowchart illustrating processing of allocating memory regions to be used in the image rotating processing. Referring to FIG. 17, image rotating portion 215 ensures a memory region in RAM 204 for temporarily storing a row y of the rotated image data so that each of the rows starting from the first row is successively stored in the memory region thus ensured for one row (S501 and S503). FIG. 18 shows a specific example of the memory regions for temporarily storing row y of the rotated image data. Referring to FIG. 18, a memory region 500 for temporarily storing one row y is formed of a row number region 501 storing a row number of the rotated image data, and a data region 502 for storing the rotated image data corresponding to the row number. Image rotating portion 215 stores row number y indicating the row of rotated image data in row number region 501 (S505).

Then, image rotating portion 215 calculates a coordinate of the row of the original image corresponding to row y of the rotated image (S507).

Then, image rotating portion 215 stores the image data at the row of the original image corresponding to rotated row y in data region 502 of memory region 500 (S509).

Figure 19:
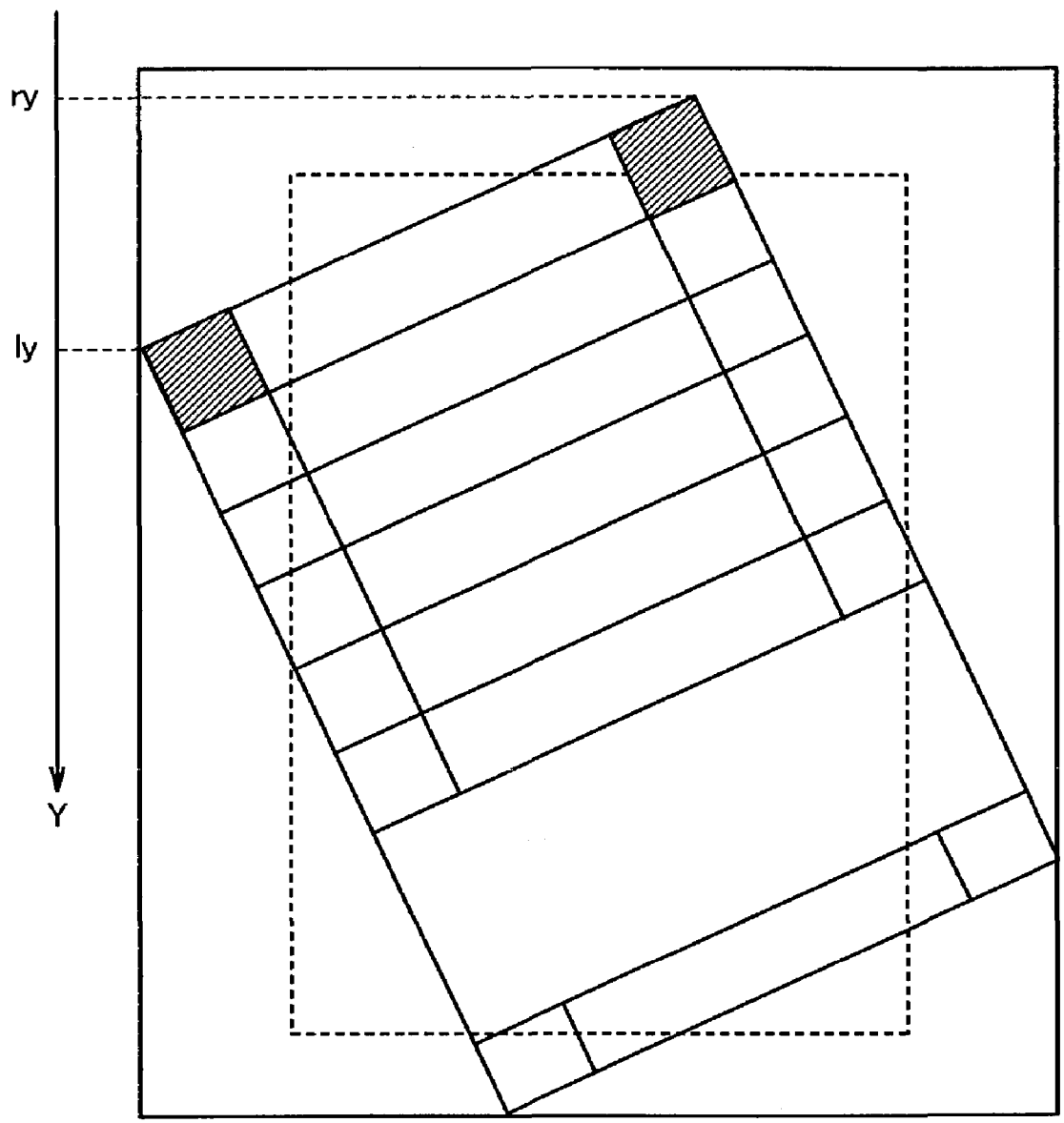
FIG. 19 shows a specific example of y coordinates ly and ry of the left and right ends of a row of an original image corresponding to a row y subjected to rotating processing.

Then, image rotating portion 215 assigns values ly and ry to y-coordinates at the left and right ends of the row of the original image corresponding to rotated row y and calculated in step S507, respectively (S511 and S513). FIG. 19 specifically shows, by way of example, y-coordinates ly and ry at the left and right ends of the row of the original image corresponding to rotated row y (first row in FIG. 19).

Then, image rotating portion 215 retrieves all the rows smaller than value ly and smaller than value ry from all the row number regions in the memory region, which is ensured in the memory region of RAM 204 for all the rows of the rotated image data (S515).

Then, image rotating portion 215 releases the row number region of the memory region ensured for the retrieved row (S517).

Image rotating portion 215 successively increments by one row the data region storing the rotated image data corresponding to each row of the rotated image data (S519), repeats the above processing until the rotating processing of all the rows of the original image is completed (NO in S521), and successively stores the image data subjected to the rotating processing.

By executing the processing of allocating the memory regions used for the foregoing image rotating processing by image processing device 200 of the embodiment, it is possible to reduce the memory regions used for the image rotating processing.

In the embodiment described above, each of the longitudinal and lateral resolutions of the whole image provided to image processing device 200 is uniform. However, the longitudinal and/or lateral resolutions of the input image may be variable. For example, the input image may contain a region having a resolution different from that of the other portion. In this case, image processing device 200 extracts each region having a uniform resolution, performs the foregoing inclination correcting processing on each region independently of the others, and then combines the respective regions subjected to the inclination correction.

Figure 20:
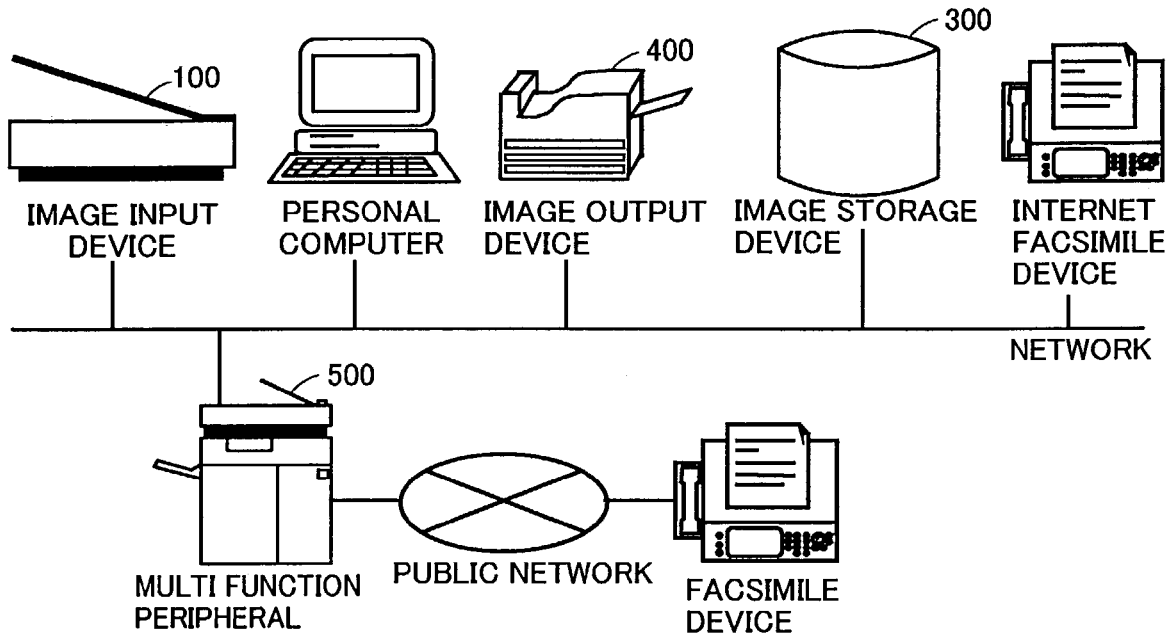
FIG. 20 shows a specific example of a structure of an image processing system of another embodiment of the invention.

Further, the inclination correcting processing according to the invention can likewise be achieved in another embodiment shown in FIG. 20. Referring to FIG. 20, an image processing system of this embodiment includes image input device 100 such as a scanner, MFP 500, image storage device 300 and image output device 400 such as a printer, connected via a network. Still further, as shown in FIG. 20, the image processing system may include via a network other device s such as a personal computer and an internet facsimile device. Additionally, other device s such as a facsimile device may be connected to MFP 500 via a public network.

Figure 21:
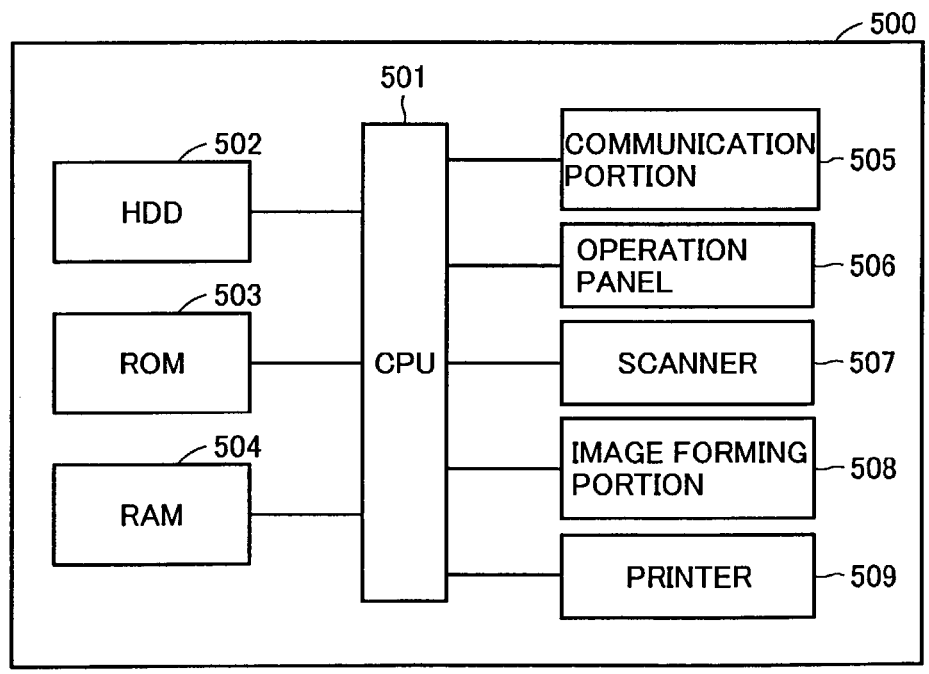
FIG. 21 is a bock diagram showing a structure of an MFP 500 shown in FIG. 20.
Figure 22:
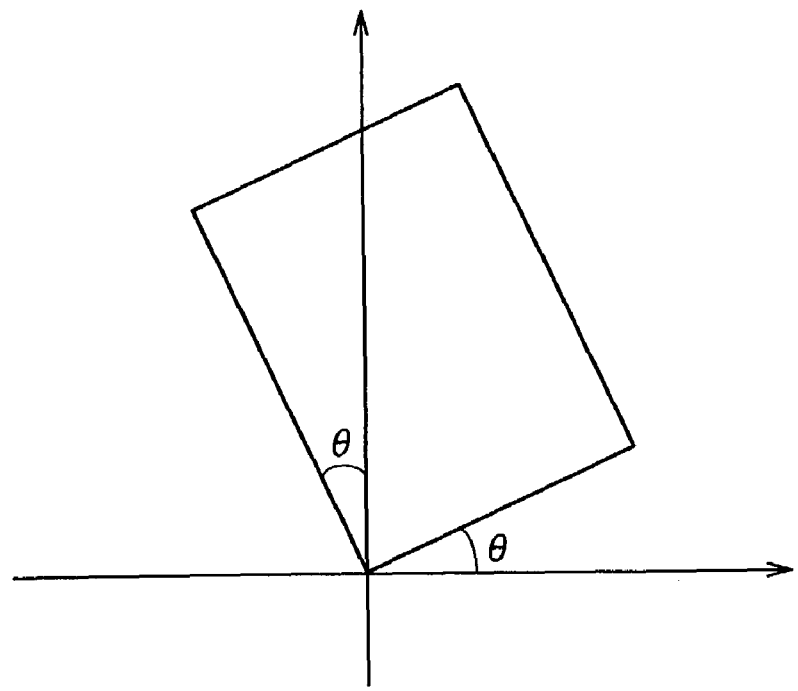
FIG. 22 shows a specific example of an inclination angle of an image in the case where a read image has longitudinal and lateral resolutions equal to each other.
Figure 23:
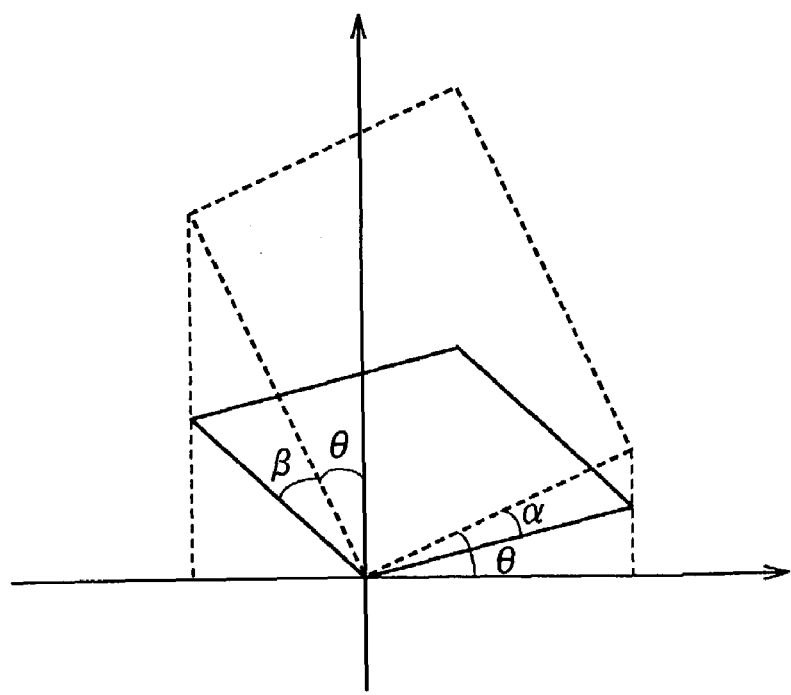
FIG. 23 shows a specific example of inclination angles of longitudinal and lateral directions of an image in the case where a read image has longitudinal and lateral resolutions different from each other.

MFP 500 integrally includes a scanner for reading a document image, a printer for printing image data and a communication portion for external communication, and a specific structure thereof is shown in FIG. 21. Referring to FIG. 21, MFP 500 is controlled by a CPU 501, and processes the image data supplied from another device, i.e., image input device 100 via a communication portion 505. Also, MFP 500 provides the processed image data via communication portion 505 to another device, i.e., image storage device 300 or image output device 400. Further, MFP 500 can provide, from communication portion 505 via a network, an image data to another device, i.e., a personal computer or an internet facsimile device. Still further, MFP 500 can communicate from communication portion 505 via a public network, i.e., a telephone network, an image data to another device with a facsimile function connected to the telephone network.

MFP 500 receives an instruction entered by a user via an operation panel 506, and reads a document image by a scanner 507. The document image read by scanner 507 and the image supplied via communication portion 505 from image input device 100 are subjected to the image formation by an image forming portion 508, and are output from a printer 509.

The program executed by CPU 501 is stored in a storing portion, i.e., a HDD 502 or a ROM 503. A RAM 504 provides a temporary work region for executing the program by CPU 501. Also, RAM 504 provides a memory region serving as a temporary storage region for executing the program by CPU 501. The structure shown in FIG. 21 is a general structure of the MFP, and the structure of MFP 500 is not restricted to that shown in FIG. 21. Thus, MFP 500 is merely required to integrally include at least two device s among scanner 507 for reading the document image, printer 509 for printing the image data and communication portion 505 for external communication.

MFP 500 of another embodiment performs the processing similar to that of image processing device 200 of the foregoing embodiment. MFP 500 of another embodiment corrects the inclination by effecting the processing, which is similar to that performed by image processing device 200 already described, on a document image read by scanner 507 or a document image supplied via communication portion 505 from image input device 100. The processing performed by MFP 500 is similar to that by image processing device 200, and therefore, description thereof is not repeated.

In this embodiment, even though a document image read by scanner 507 or a document image supplied via communication portion 505 from image input device 100 is inclined, such processing by MFP 500 allows integrally configured printer 509 to print the image corrected for the inclination. Further, the image data corrected for the inclination can be provided to an external device, i.e., a personal computer, a facsimile device, or an image output device 400.

The inclination correcting method performed by the image processing device or MFP described above can be provided in the form of a program. The program can be recorded on or in a computer-readable record medium such as a flexible drive for the computer, a CD-ROM (Compact Disk-Read Only Memory), ROM (Read Only Memory), RAM (Random Access Memory) and/or memory card, and can be provided as a program product. Also, the program may be provided by recording it on an internal hard disk of a computer. Further, a program can be provided over a network allowing downloading.

The program product provided as described above is executed after being installed in a program storage portion such as a hard disk. The program product includes a program itself and a record medium storing the program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device comprising:
   an extracting portion for extracting longitudinal and lateral resolutions of an input image;
   a first resolution converting portion for determining whether said extracted longitudinal and lateral resolutions of said image are equal to each other or not, and converting one of said longitudinal and lateral resolutions to become equal to the other and thereby to provide the longitudinal and lateral resolutions equal to each other when said longitudinal and lateral resolutions are different from each other;
   a detecting portion for detecting an inclination of said input image;
   an inclination correcting portion for correcting an inclination of the image having the resolution converted by said first resolution converting portion by rotating said image in accordance with the inclination of said image detected by said detecting portion; and
   a second resolution converting portion for performing resolution conversion on the image subjected to the inclination correction by said inclination correcting portion to convert said one resolution converted by said first resolution converting portion to the original resolution.

2. The image processing device according to claim 1, wherein
   said first resolution converting portion converts the lower resolution between the longitudinal and lateral resolutions of said image to become equal to the other of said resolutions when said lower resolution is lower than a predetermined resolution.

3. The image processing device according to claim 1, wherein
   said first resolution converting portion converts the higher resolution between the longitudinal and lateral resolutions of said image to become equal to the lower resolution when said lower resolution is higher than a predetermined resolution.

4. The image processing device according to claim 1, wherein
   said detecting portion extracts, as a first inclination detection region, a regular square region containing most edge components from an edge image produced by reducing and changing said image having the converted resolution into a binary form, performs calculation on each of said first inclination detection region and a second inclination detection region prepared by rotating said first inclination detection region by 90 degrees to calculate a degree of undulation of a cumulative histogram of said edge components for each of predetermined ranges of the detection angles, and determines the detection angle providing the largest degree of undulation as the inclination of said image.

5. The image processing device according to claim 1, wherein
   said image processing device is a multi-functional peripheral integrally formed of at least two of a scanner for reading a document image, a printer for printing an image data and a communication portion for communication with an external device,
   said extracting portion extracts longitudinal and lateral resolutions of an image read by said scanner or an image received from said external device via said communication portion, and
   said detecting portion detects the inclination of the image read by said scanner or the image received from said external device via said communication portion.

6. An image processing device comprising:
   an extracting portion for extracting longitudinal and lateral resolutions of an input image;
   a first resolution converting portion for determining whether said extracted longitudinal and lateral resolutions of said image are equal to each other or not, and converting one of said longitudinal and lateral resolutions to become equal to the other and thereby to provide the longitudinal and lateral resolutions equal to each other when said longitudinal and lateral resolutions are different from each other;
   a detecting portion for detecting an inclination of said input image;
   an inclination correcting portion for correcting an inclination of the image having the resolution converted by said first resolution converting portion by rotating said image in accordance with the inclination of said image detected by said detecting portion; and
   a second resolution converting portion for performing resolution conversion on the image subjected to the inclination correction by said inclination correcting portion to convert said one resolution converted by said first resolution converting portion to an intended resolution.

7. The image processing device according to claim 6, wherein
   said first resolution converting portion converts the lower resolution between the longitudinal and lateral resolutions of said image to become equal to the other of said resolutions when said lower resolution is lower than a predetermined resolution.

8. The image processing device according to claim 6, wherein
   said first resolution converting portion converts the higher resolution between the longitudinal and lateral resolutions of said image to become equal to the lower resolution when said lower resolution is higher than a predetermined resolution.

9. The image processing device according to claim 6, wherein
   said detecting portion extracts, as a first inclination detection region, a regular square region containing most edge components from an edge image produced by reducing and changing said image having the converted resolution into a binary form, performs calculation on each of said first inclination detection region and a second inclination detection region prepared by rotating said first inclination detection region by 90 degrees to calculate a degree of undulation of a cumulative histogram of said edge components for each of predetermined ranges of the detection angles, and determines the detection angle providing the largest degree of undulation as the inclination of said image.

10. The image processing device according to claim 6, wherein
    said image processing device is a multi-functional peripheral integrally formed of at least two of a scanner for reading a document image, a printer for printing an image data and a communication portion for communication with an external device, said extracting portion extracts longitudinal and lateral resolutions of an image read by said scanner or an image received from said external device via said communication portion, and said detecting portion detects the inclination of the image read by said scanner or the image received from said external device via said communication portion.

11. An image processing device comprising:

an extracting portion for extracting longitudinal and lateral resolutions of an input image;

a first resolution converting portion for determining whether said extracted longitudinal and lateral resolutions of said image are equal to each other or not, and converting said longitudinal and lateral resolutions to predetermined specific resolutions, respectively, when said longitudinal and lateral resolutions are different from each other;

a detecting portion for detecting an inclination of said input image;

an inclination correcting portion for correcting an inclination of the image having the resolution converted by said first resolution converting portion by rotating said image by an inclination angle of said image detected by said detecting portion in a direction opposite to the detected inclination; and a second resolution converting portion for performing resolution conversion on the image subjected to the inclination correction by said inclination correcting portion to convert the longitudinal and lateral resolutions converted by said first resolution converting portion to the original resolutions, respectively.

12. The image processing device according to claim 11, wherein said image processing device is a multi-functional peripheral integrally formed of at least two of a scanner for reading a document image, a printer for printing an image data and a communication portion for communication with an external device, said extracting portion extracts longitudinal and lateral resolutions of an image read by said scanner or an image received from said external device via said communication portion, and said detecting portion detects the inclination of the image read by said scanner or the image received from said external device via said communication portion.

13. An image processing method comprising:

an extracting step of extracting longitudinal and lateral resolutions of an input image;

a first resolution converting step of determining whether said extracted longitudinal and lateral resolutions of said image are equal to each other or not, and converting one of said longitudinal and lateral resolutions to become equal to the other and thereby to provide the longitudinal and lateral resolutions equal to each other when said longitudinal and lateral resolutions are different from each other;

an inclination correcting step of correcting an inclination of the image having the resolution converted in said first resolution converting step by rotating the image by a predetermined angle; and a second resolution converting step of performing resolution conversion on the image subjected to the inclination correction in said inclination correcting step to convert said one resolution converted in said first resolution converting step to the original resolution.

14. The image processing method according to claim 13, wherein said first resolution converting step converts the lower resolution between the longitudinal and lateral resolutions of said image to become equal to the other of the resolutions when said lower resolution is lower than a predetermined resolution.

15. The image processing method according to claim 13, wherein said first resolution converting step converts the higher resolution between the longitudinal and lateral resolutions of said image to become equal to the lower resolution when said lower resolution is higher than a predetermined resolution.

16. An image processing method comprising:

an extracting step of extracting longitudinal and lateral resolutions of an input image;

a first resolution converting step of determining whether said extracted longitudinal and lateral resolutions of said image are equal to each other or not, and converting the longitudinal and lateral resolutions to predetermined specific resolutions, respectively, when said longitudinal and lateral resolutions are different from each other;

an inclination correcting step of correcting an inclination of the image having the resolution converted in said first resolution converting step by rotating the image by a predetermined inclination angle; and a second resolution converting step of performing resolution conversion on the image subjected to the inclination correction in said inclination correcting step to convert said longitudinal and lateral resolutions converted in said first resolution converting step to the original resolutions, respectively.

17. An image processing program product embodied on a computer readable medium for executing, by a computer, image processing comprising:

an extracting step of extracting longitudinal and lateral resolutions of an input image;

a first resolution converting step of determining whether said extracted longitudinal and lateral resolutions of said image are equal to each other or not, and converting one of said longitudinal and lateral resolutions to become equal to the other and thereby to provide the longitudinal and lateral resolutions equal to each other when said longitudinal and lateral resolutions are different from each other;

an inclination correcting step of correcting an inclination of the image having the resolution converted in said first resolution converting step by rotating the image by a predetermined angle; and a second resolution converting step of performing resolution conversion on the image subjected to the inclination correction in said inclination correcting step to convert said one resolution converted in said first resolution converting step to the original resolution.

18. An image processing program product embodied on a computer readable medium for executing, by a computer, image processing comprising:

an extracting step of extracting longitudinal and lateral resolutions of an input image;

a first resolution converting step of determining whether said extracted longitudinal and lateral resolutions of said image are equal to each other or not, and converting the longitudinal and lateral resolutions to predetermined specific resolutions, respectively, when said longitudinal and lateral resolutions are different from each other;

an inclination correcting step of correcting an inclination of the image having the resolution converted in said first resolution converting step by rotating the image by a predetermined inclination angle; and a second resolution converting step of performing resolution conversion on the image subjected to the inclination correction in said inclination correcting step to convert said longitudinal and lateral resolutions converted in said first resolution converting step to the original resolutions, respectively.

* * * * *